(12) United States Patent
Joten

(10) Patent No.: US 7,072,009 B2
(45) Date of Patent: Jul. 4, 2006

(54) LIQUID CRYSTAL DISPLAY DEVICE

(75) Inventor: Kazuhiro Joten, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 109 days.

(21) Appl. No.: 10/934,433

(22) Filed: Sep. 7, 2004

(65) Prior Publication Data

US 2005/0052591 A1    Mar. 10, 2005

(30) Foreign Application Priority Data

Sep. 9, 2003   (JP) .............................. 2003-317164
Aug. 27, 2004  (JP) .............................. 2004-248754

(51) Int. Cl.
*G02F 1/1335* (2006.01)
(52) U.S. Cl. .......................... 349/96; 349/117
(58) Field of Classification Search ................. 349/96, 349/117
See application file for complete search history.

(56) References Cited

U.S. PATENT DOCUMENTS 6,169,590 B1 *  1/2001  Abileah et al. ............. 349/120
6,411,355 B1 *  6/2002  Manabe et al. ............. 349/120
6,839,110 B1 *  1/2005  Yamahara et al. .......... 349/118
2005/0052591 A1  3/2005  Joten

FOREIGN PATENT DOCUMENTS

JP         1-270024        10/1989

OTHER PUBLICATIONS

U.S. Appl. No. 11/219,761, filed Sep. 7, 2005, Joten.

* cited by examiner

*Primary Examiner*—Andrew Schechter
*Assistant Examiner*—David Chung
(74) *Attorney, Agent, or Firm*—Oblon, Spivak, McClelland, Maier & Neustadt, P.C.

(57) ABSTRACT

A first polarization control element POL1 provided on an outer surface of an array substrate AR and a second polarization control element POL2 provided on an outer surface of a counter-substrate CT control a polarization state of light that passes therethrough, such that light in a polarization state of elliptically polarized light is to be incident on the liquid crystal layer LQ. An ellipticity of elliptically polarized light, which is incident on the liquid crystal display panel LPN in a principal viewing-angle direction is greater than an ellipticity of elliptically polarized light, which is incident in a anti-principal viewing-angle direction.

15 Claims, 26 Drawing Sheets

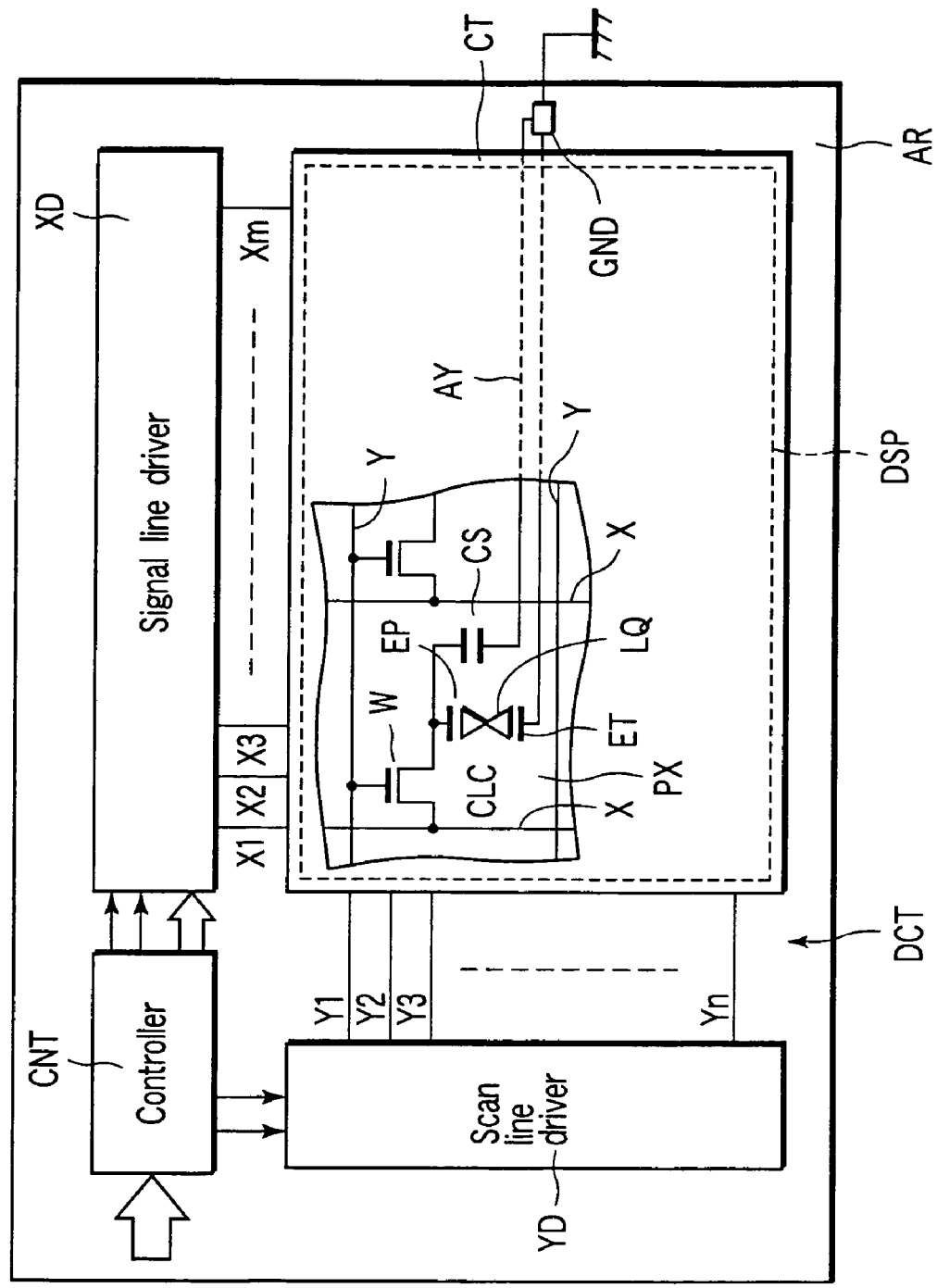
F I G. 1

| | |
|---|---|
| A | 0° |
| B | 36° |
| C | 98° |
| D | 150.5° |
| R value of first phase plate | 150nm |
| R value of second phase plate | 145nm |

| | | Comparative example 1 (two phase plates) | First embodiment (single phase plate) |
|---|---|---|---|
| | Ellipticity | 0.88 | 0.75 |
| Reflection | Reflectance | 7.00% | 6.98% |
| | Contrast | 25 | 15 |
| | Hue of white | (0.319,0.339) | (0.321,0.341) |
| Transmission | Transmittance | 4.4% | 4.4% |
| | Contrast | 136 | 113 |
| | Hue of white | (0.303,0.327) | (0.310,0.330) |

FIG. 8

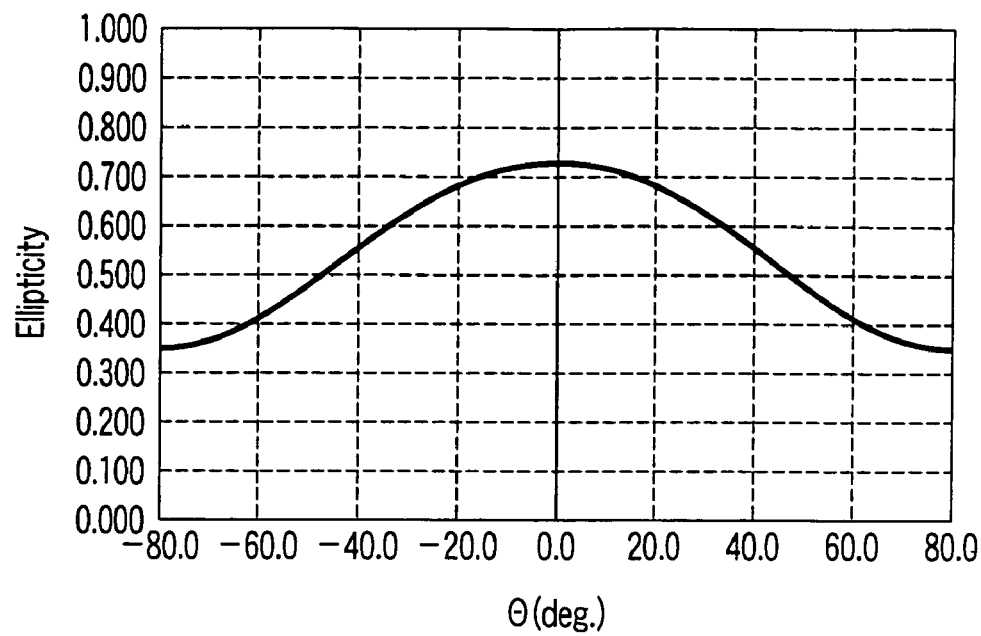
F I G. 9
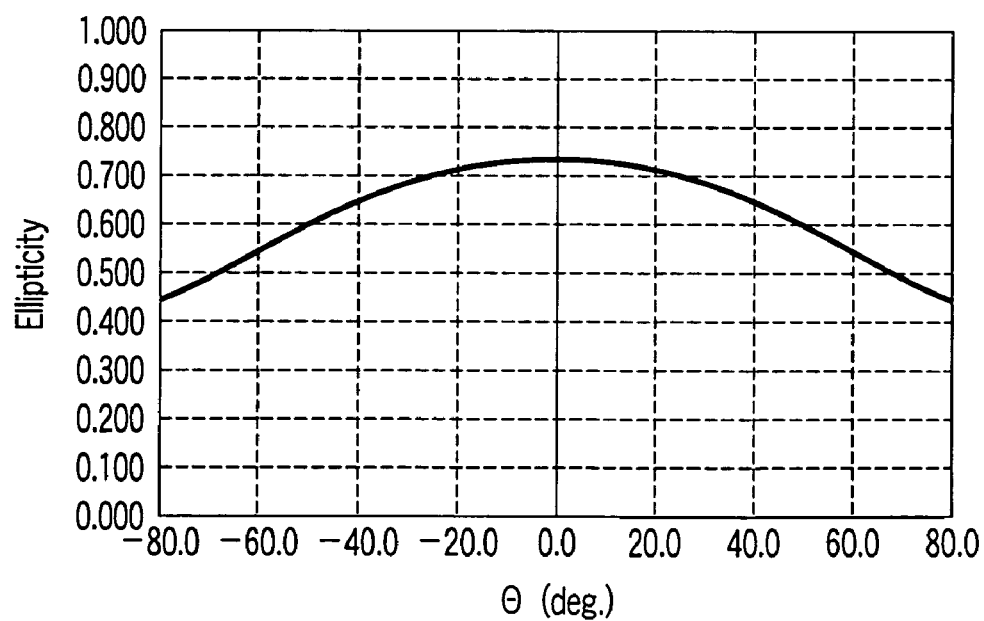
F I G. 10

| | | |
|---|---|---|
| A | 0° | θ2=36° |
| B | 36° | |
| C | 98° | θ1=52.5° |
| D | 150.5° | |
| WV Film (53A) | 225° | |
| WV Film (53B) | 315° | |
| R value of first phase plate | 150nm | |
| R value of second phase plate | 145nm | |

Equal contrast ratio contour

| A | 0° | θ2=36° |
|---|---|---|
| B | 36° | |
| C | 100° | θ1=54° |
| D | 154° | |
| WV Film (53) | 337° | |
| R value of first phase plate | 195nm | |
| R value of second phase plate | 145nm | |

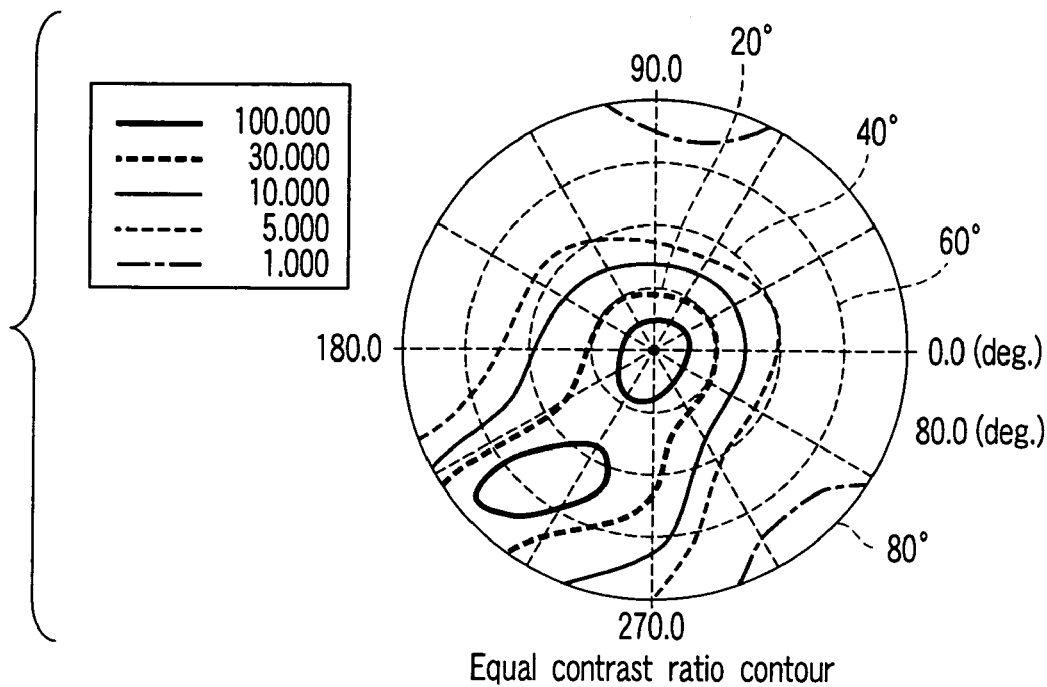
Equal contrast ratio contour
F I G. 19
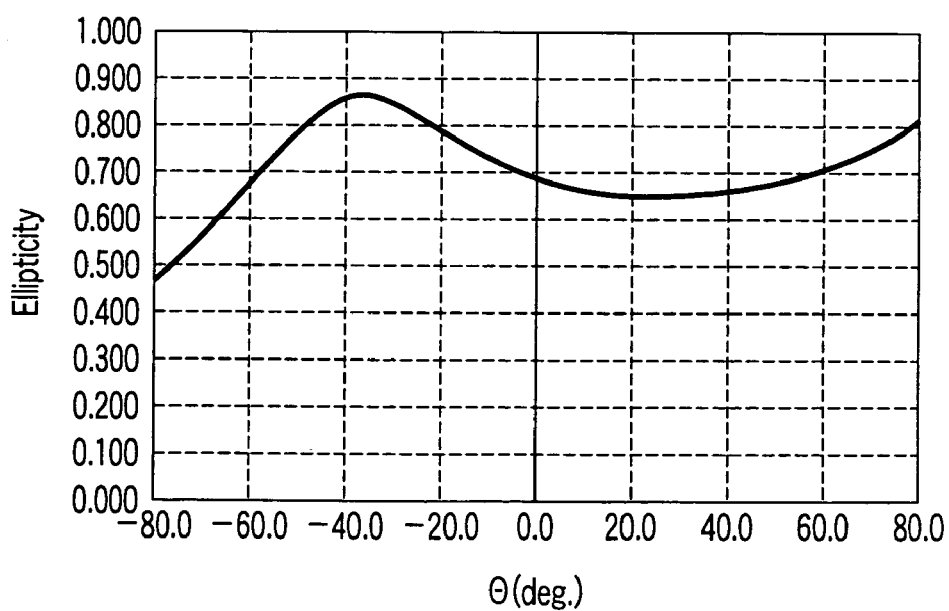
F I G. 20

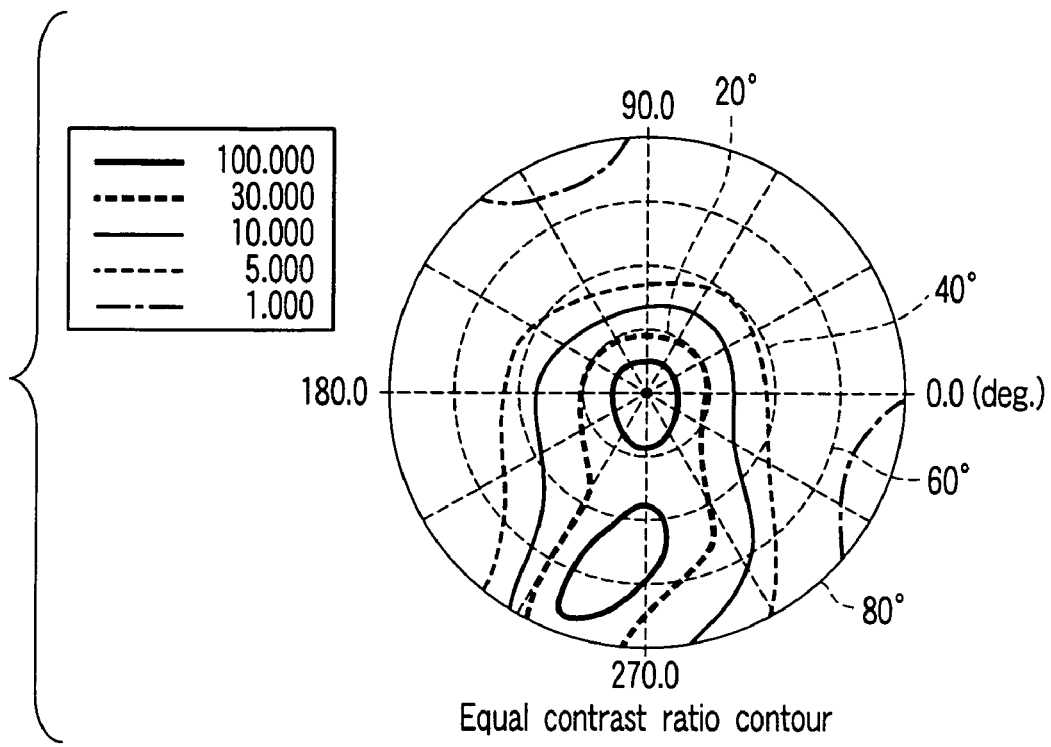
F I G. 21
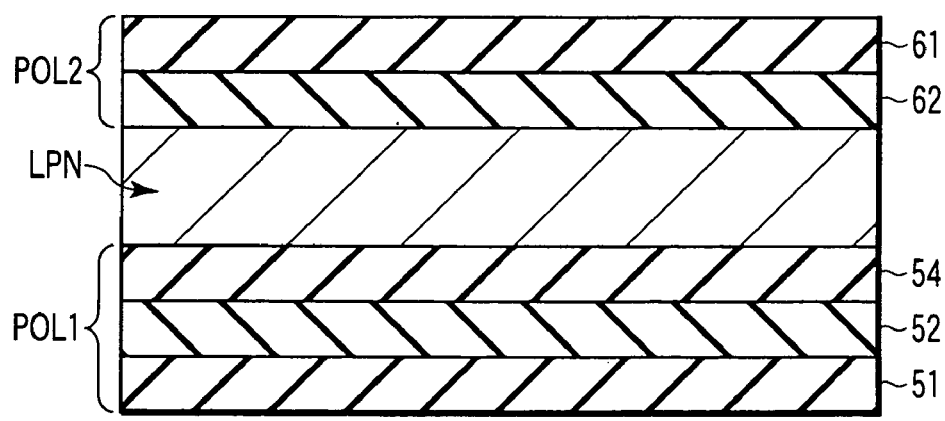
F I G. 22

| | |
|---|---|
| A | 0° |
| B | 36° |
| C | 98° |
| D | 165.5° |
| NR Film (54) | 148° |
| R value of first phase plate | 65nm |
| R value of second phase plate | 145nm |

$\theta 2 = 36°$ (B, A)
$\theta 1 = 67.5°$ (C, D)

Equal contrast ratio contour

Equal contrast ratio contour

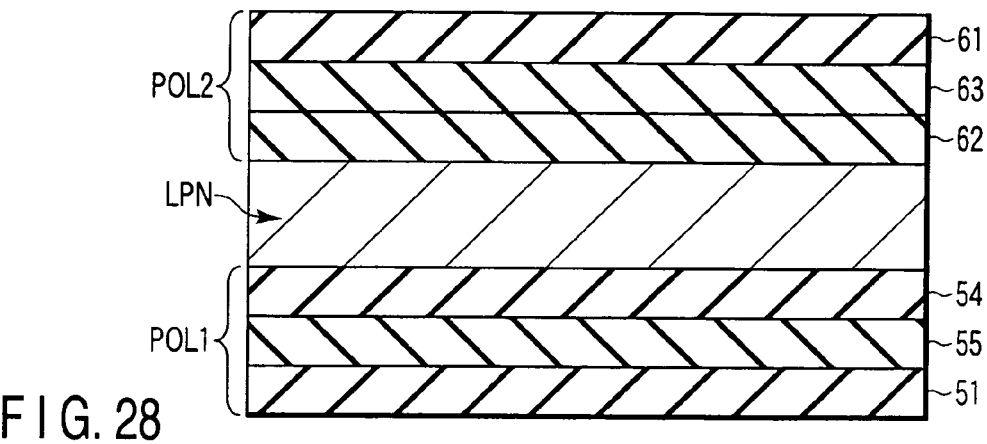
FIG. 27
| A | 0° |
| --- | --- |
| B | 36° |
| C | 95° |
| NR Film (54) | 148° |
| NR value of NR film | 150nm |
| Value of second phase plate | 145nm |
$\theta 2 = 36°$
FIG. 28
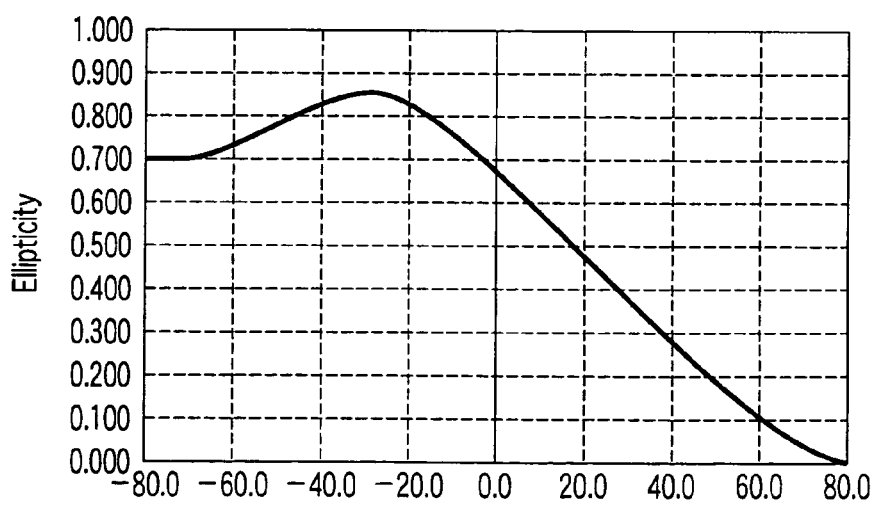
FIG. 29

| A | 0° | θ2=35° |
|---|---|---|
| B | 36° | |
| C | 93.5° | θ1=53° |
| D | 146.5° | |
| R value of first phase plate | 145nm | |
| R value of second phase plate | 145nm | |

|  | | Comparative example 2 (two phase plates) | Six embodiment (single phase plate) |
|---|---|---|---|
| | Ellipticity | 0.67 | 0.67 |
| Reflection | Reflectance | 8.30% | 8.30% |
| | Contrast | 13 | 12 |
| | Hue of white | (0.317,0.343) | (0.321,0.344) |
| Transmission | Transmittance | 4.20% | 4.20% |
| | Contrast | 60 | 70 |
| | Hue of white | (0.289,0.327) | (0.295,0.330) |
F I G. 32
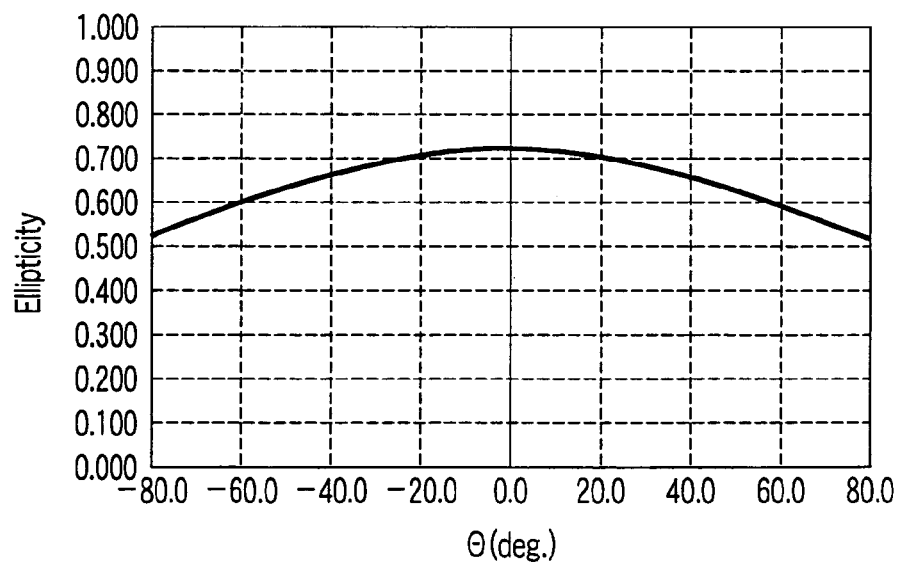
F I G. 33

| A | 0° | $\theta 2=35°$ |
|---|---|---|
| B | 36° | |
| C | 91.5° | $\theta 1=53.5°$ |
| D | 145° | |
| R value of first phase plate | 145nm | |
| R value of second phase plate | 145nm | |

|  | | Comparative example 3 (two phase plates) | Seven embodiment (single phase plate) |
|---|---|---|---|
| | Ellipticity | 0.67 | 0.67 |
| Reflection | Reflectance | 7.50% | 7.60% |
| | Contrast | 23 | 23 |
| | Hue of white | (0.327,0.361) | (0.322,0.355) |
| Transmission | Transmittance | 4.20% | 4.20% |
| | Contrast | 125 | 188 |
| | Hue of white | (0.303,0.328) | (0.304,0.327) |
F I G. 36
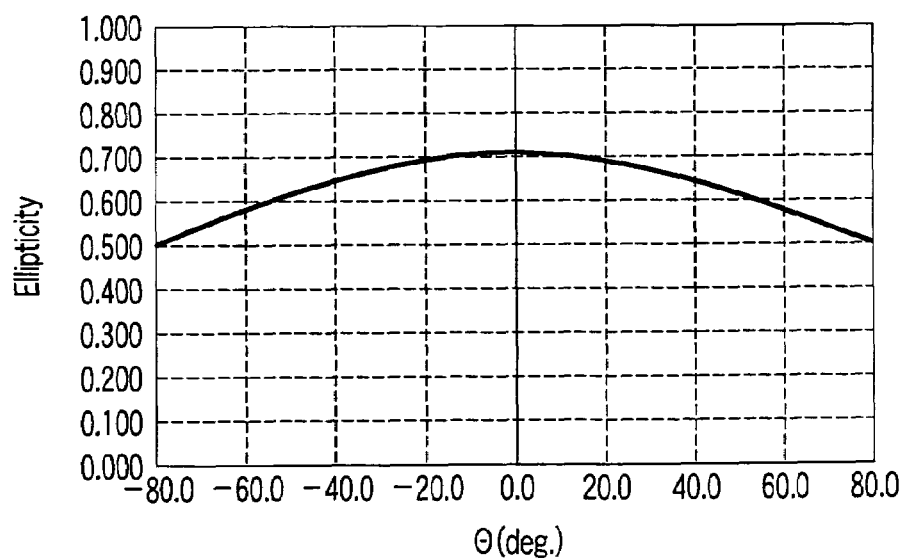
F I G. 37

Equal contrast ratio contour

| A | 1° | } θ2=39° |
|---|---|---|
| B | 36° | |
| C | 89° | } θ1=55° |
| D | 144° | |
| R value of first phase plate | 145nm | |
| R value of second phase plate | 145nm | |

|  | Comparative example 4 (two phase plates) | Eight embodiment (single phase plate) |
|---|---|---|
| Ellipticity | 0.67 | 0.67 |
| Reflection — Reflectance | 9.70% | 9.70% |
| Reflection — Contrast | 15 | 14 |
| Reflection — Hue of white | (0.299,0.317) | (0.301,0.319) |
| Transmission — Transmittance | 5.20% | 5.20% |
| Transmission — Contrast | 120 | 120 |
| Transmission — Hue of white | (0.319,0.338) | (0.320,0.338) |

| A | 1° | } θ2=35° |
| --- | --- | --- |
| B | 36° | |
| C | 92.5° | } θ1=53° |
| D | 145.5° | |
| R value of first phase plate | 135nm | |
| R value of second phase plate | 145nm | |

| | | Comparative example 5 (two phase plates) | Nine embodiment (single phase plate) |
|---|---|---|---|
| | Ellipticity | 0.67 | 0.67 |
| Reflection | Reflectance | 8.30% | 8.30% |
| | Contrast | 13 | 12 |
| | Hue of white | (0.317,0.343) | (0.321,0.344) |
| Transmission | Transmittance | 4.20% | 4.20% |
| | Contrast | 60 | 65 |
| | Hue of white | (0.289,0.327) | (0.295,0.330) |

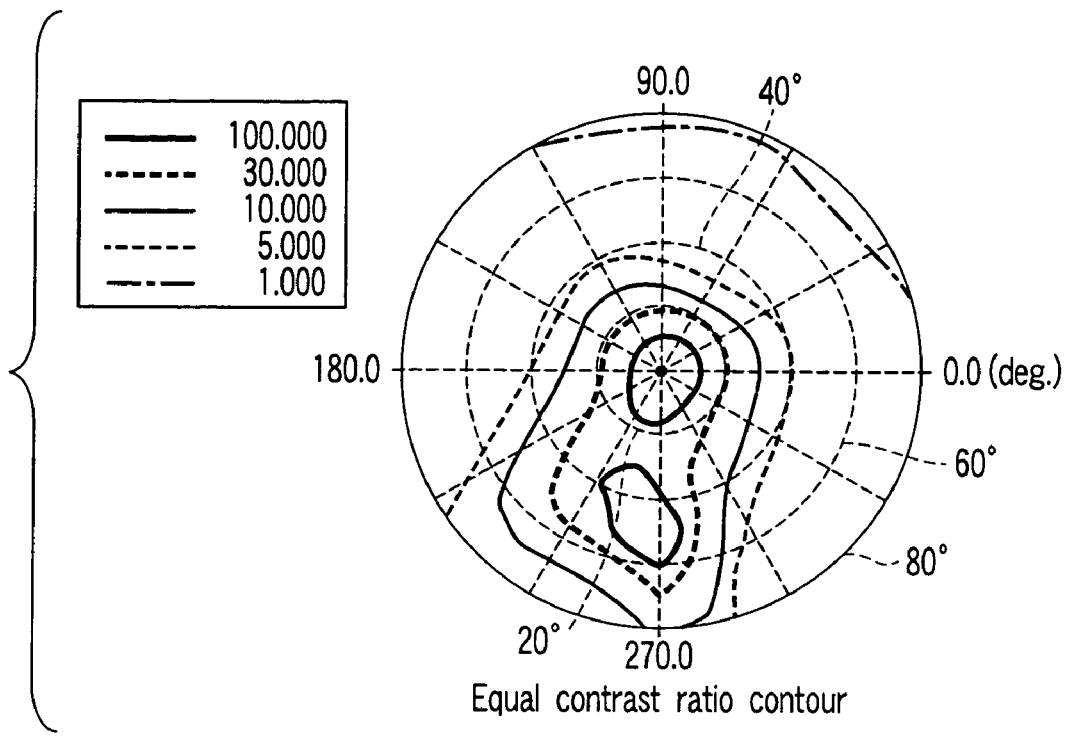
F I G. 46
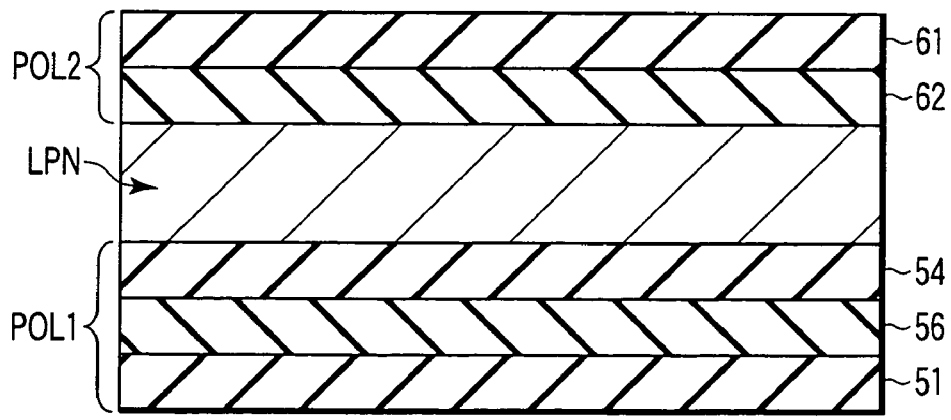
F I G. 47

| A | 1° | } θ2=35° |
|---|---|---|
| B | 36° | |
| C | 132° | } θ1=72° |
| D | 60° | |
| R value of NR film (54) | 120nm | |
| R value of second phase plate | 145nm | |
| R value of compensation plate | 270nm | |
| Axial angle of compensation plate | 167.5° | |

FIG. 48

| | | Comparative example 6 (two phase plates) | Ten embodiment (single phase plate) |
|---|---|---|---|
| | Ellipticity | 0.67 | 0.67 |
| Reflection | Reflectance | 8.30% | 8.30% |
| | Contrast | 13 | 12 |
| | Hue of white | (0.317,0.343) | (0.321,0.344) |
| Transmission | Transmittance | 4.20% | 4.20% |
| | Contrast | 60 | 60 |
| | Hue of white | (0.289,0.327) | (0.294,0.327) |

FIG. 49

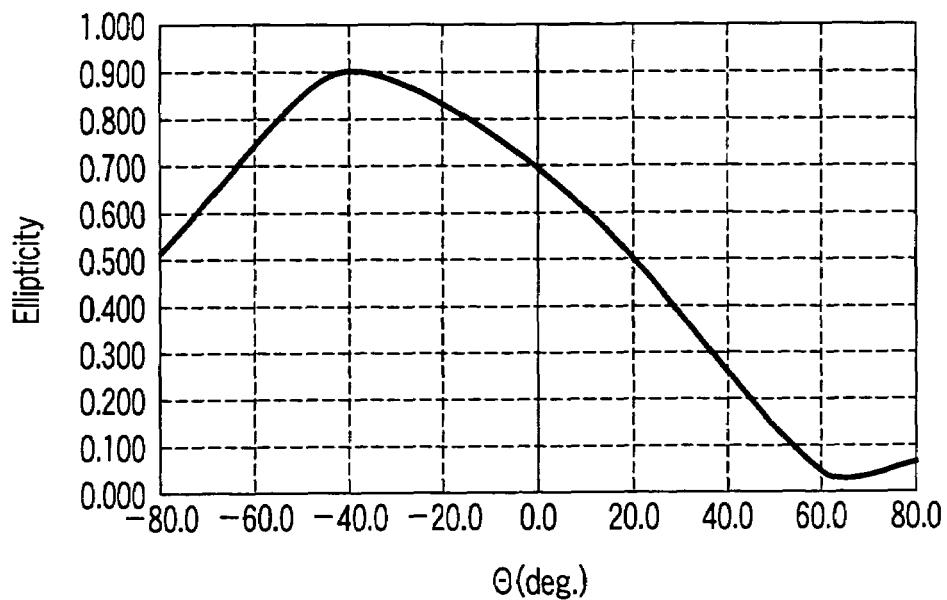
F I G. 50
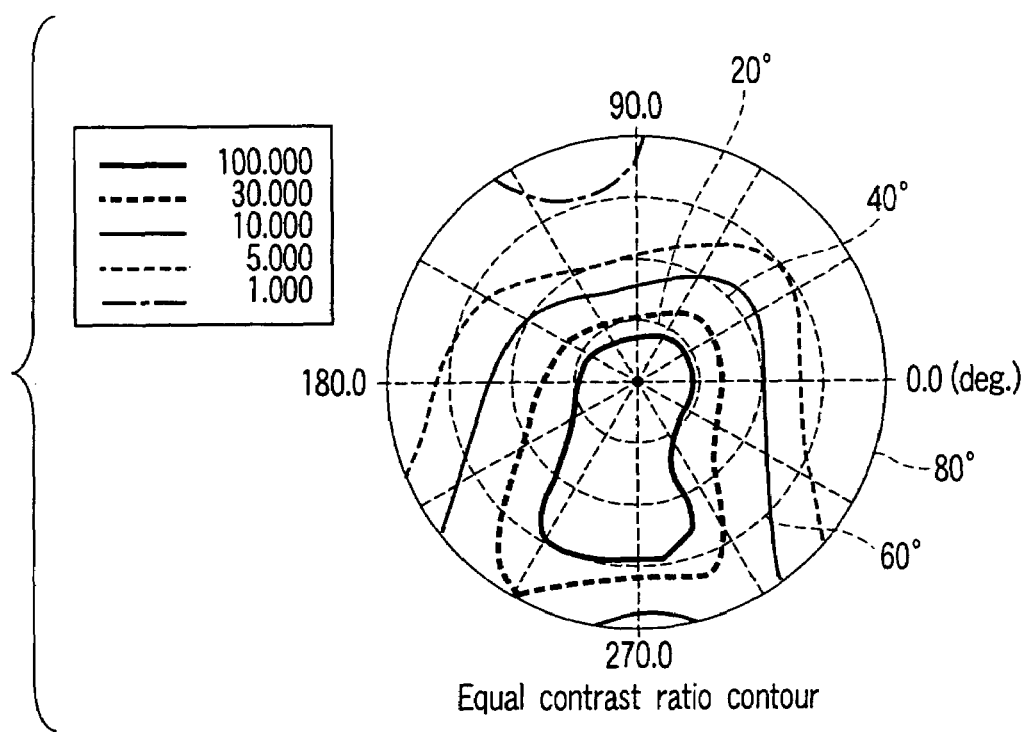
Equal contrast ratio contour
F I G. 51

LIQUID CRYSTAL DISPLAY DEVICE

CROSS-REFERENCE TO RELATED APPLICATIONS

This application is based upon and claims the benefit of priority from prior Japanese Patent Applications No. 2003-317164, filed Sep. 9, 2003; and No. 2004-248754, filed Aug. 27, 2004, the entire contents of both of which are incorporated herein by reference.

BACKGROUND OF THE INVENTION

1. Field of the Invention

The present invention relates generally to a liquid crystal display device, and more particularly to a semi-transmission type liquid crystal display device wherein a single pixel includes a reflection section that displays an image using ambient light, and a transmission section that displays an image using backlight.

2. Description of the Related Art

In a semi-transmission type liquid crystal display device, a single pixel includes a reflection section with a reflective electrode, and a transmission section with a transmissive electrode. In a dark place, the semi-transmission type liquid crystal display device functions as a transmission-type liquid crystal display device that displays an image by selectively transmitting backlight using the transmission section within the pixel. In a light place, the semi-transmission type liquid crystal display device functions as a reflection-type liquid crystal display device that displays an image by selectively reflecting ambient light using the reflection section within the pixel. Thereby, power consumption can greatly be reduced.

In the semi-transmission type liquid crystal display device, polarization control elements for controlling the polarization state of light are provided, respectively, on outer surfaces of an array substrate and a counter-substrate that constitute a liquid crystal display panel. Each of the polarization control elements is a circular polarization plate that is formed by combining a polarizer plate and two kinds of phase plates (i.e. a ½ wavelength plate that provides a phase difference of ½ wavelength between an ordinary ray and an extraordinary ray with respect to light of a predetermined wavelength, and a ¼ wavelength plate that provides a phase difference of ¼ wavelength between an ordinary ray and an extraordinary ray with respect to light of a predetermined wavelength). In short, each polarization control element controls the polarization state of light of a predetermined wavelength, which is incident on a liquid crystal layer, so that the light may become circularly polarized light (see, e.g. Jpn. Pat. Appln. KOKAI Publication No. 01-270024).

There are various uses of the semi-transmission type liquid crystal display device having the above-described structure. Because of its features, special attention has been paid to the use of the semi-transmission type liquid crystal display device as a display device for a mobile phone. When the application to the mobile phone is considered, there is a strong demand for improvement in viewing-angle characteristics in a transmission display mode, from the standpoint of practical use.

For example, the semi-transmission type liquid crystal display device, which is configured to have polarization control elements each including the aforementioned two kinds of phase plates, has a viewing-angle characteristic of 30° (CR (contrast)=10), which is very narrow and poses a problem. In particular, there is a demand for improvement in viewing-angle characteristics in a case where a liquid crystal display panel is observed in a viewing direction with an inclination from a normal direction of the panel toward the upper side or lower side of the screen.

BRIEF SUMMARY OF THE INVENTION

The present invention has been made in consideration of the above-described problems, and the object of the invention is to provide a liquid crystal display device with good optical characteristics, which can achieve reduction in thickness and manufacturing cost.

According to a first aspect of the present invention, there is provided a liquid crystal display device including a reflection section and a transmission section in each of a plurality of pixels arranged in a matrix, the device comprising: a liquid crystal display panel in which a liquid crystal layer is held between a first substrate and a second substrate that are disposed to face each other; a first polarization control element provided on an outer surface of the first substrate, which is opposed to a surface of the first substrate that holds the liquid crystal layer; and a second polarization control element provided on an outer surface of the second substrate, which is opposed to a surface of the second substrate that holds the liquid crystal layer, wherein the first polarization control element and the second polarization control element control a polarization state of light that passes therethrough, such that light in a polarization state of elliptically polarized light is to be incident on the liquid crystal layer, and an ellipticity of elliptically polarized light, which is incident on the liquid crystal display panel in a principal viewing-angle direction is greater than an ellipticity of elliptically polarized light, which is incident in a anti-principal viewing-angle direction.

According to a second aspect of the present invention, there is provided a liquid crystal display device including a reflection section and a transmission section in each of a plurality of pixels arranged in a matrix, the device comprising: a liquid crystal display panel in which a liquid crystal layer is held between a first substrate and a second substrate that are disposed to face each other; a first polarization control element provided on an outer surface of the first substrate, which is opposed to a surface of the first substrate that holds the liquid crystal layer; and a second polarization control element provided on an outer surface of the second substrate, which is opposed to a surface of the second substrate that holds the liquid crystal layer, wherein the first polarization control element and the second polarization control element control a polarization state of light that passes therethrough, such that light in a polarization state of elliptically polarized light is to be incident on the liquid crystal layer, and an ellipticity of elliptically polarized light, which is incident on the liquid crystal display panel in a principal viewing-angle direction is 0.45 or more.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 schematically shows the structure of a liquid crystal display device according to an embodiment of the present invention;

FIG. 7 shows examples of angles of absorption axes and slow axes to an X axis in a first polarization control element and a second polarization control element that are applied to the first embodiment, and retardation values of a first phase plate and a second phase plate;

FIG. 8 shows a comparison result of optical characteristics between Comparative Example 1 and the first embodiment;

FIG. 9 shows an example of an ellipticity distribution in relation to an angle $\Theta$ to a normal line in a liquid crystal display device according to Comparative Example 1;

FIG. 10 shows an example of an ellipticity distribution in relation to an angle $\Theta$ to a normal line in the liquid crystal display device according to the first embodiment;

FIG. 19 is a characteristic diagram illustrating the viewing-angle dependency of contrast in the liquid crystal display device according to the third embodiment;

FIG. 20 shows an example of an ellipticity distribution in relation to an angle $\Theta$ to a normal line in the liquid crystal display device according to the third embodiment;

FIG. 21 is a characteristic diagram illustrating an optimized viewing-angle dependency of contrast in the liquid crystal display device according to the third embodiment;

FIG. 22 schematically shows the structure of a liquid crystal display device according to a fourth embodiment of the invention;

FIG. 27 shows other examples of angles of absorption axes and slow axes to the X axis in the first and second polarization control elements that are applied to the fourth embodiment, and retardation values of the first and second phase plates;

FIG. 28 schematically shows the structure of a liquid crystal display device according to a fifth embodiment of the invention;

FIG. 29 shows an example of an ellipticity distribution in relation to an angle $\Theta$ to a normal line in the liquid crystal display device according to the fifth embodiment;

FIG. 32 shows a comparison result of optical characteristics between Comparative Example 2 and the sixth embodiment;

FIG. 33 shows an example of an ellipticity distribution in relation to an angle $\Theta$ to a normal line in the liquid crystal display device according to the sixth embodiment;

FIG. 36 shows a comparison result of optical characteristics between Comparative Example 3 and the seventh embodiment;

FIG. 37 shows an example of an ellipticity distribution in relation to an angle $\Theta$ to a normal line in the liquid crystal display device according to the seventh embodiment;

FIG. 46 is a characteristic diagram illustrating the viewing-angle dependency of contrast in the liquid crystal display device according to the ninth embodiment;

FIG. 47 schematically shows the structure of a liquid crystal display device according to a tenth embodiment of the invention;

FIG. 48 shows examples of angles of absorption axes and slow axes to the X axis in first and second polarization control elements that are applied to the tenth embodiment of the invention, and retardation values of first and second phase plates;

FIG. 49 shows a comparison result of optical characteristics between Comparative Example 6 and the tenth embodiment;

FIG. 50 shows an example of an ellipticity distribution in relation to an angle Θ to a normal line in the liquid crystal display device according to the tenth embodiment; and FIG. 51 is a characteristic diagram illustrating the viewing-angle dependency of contrast in the liquid crystal display device according to the tenth embodiment.

DETAILED DESCRIPTION OF THE INVENTION

A liquid crystal display device according to an embodiment of the present invention will now be described with reference to the accompanying drawings.

Figure 2:
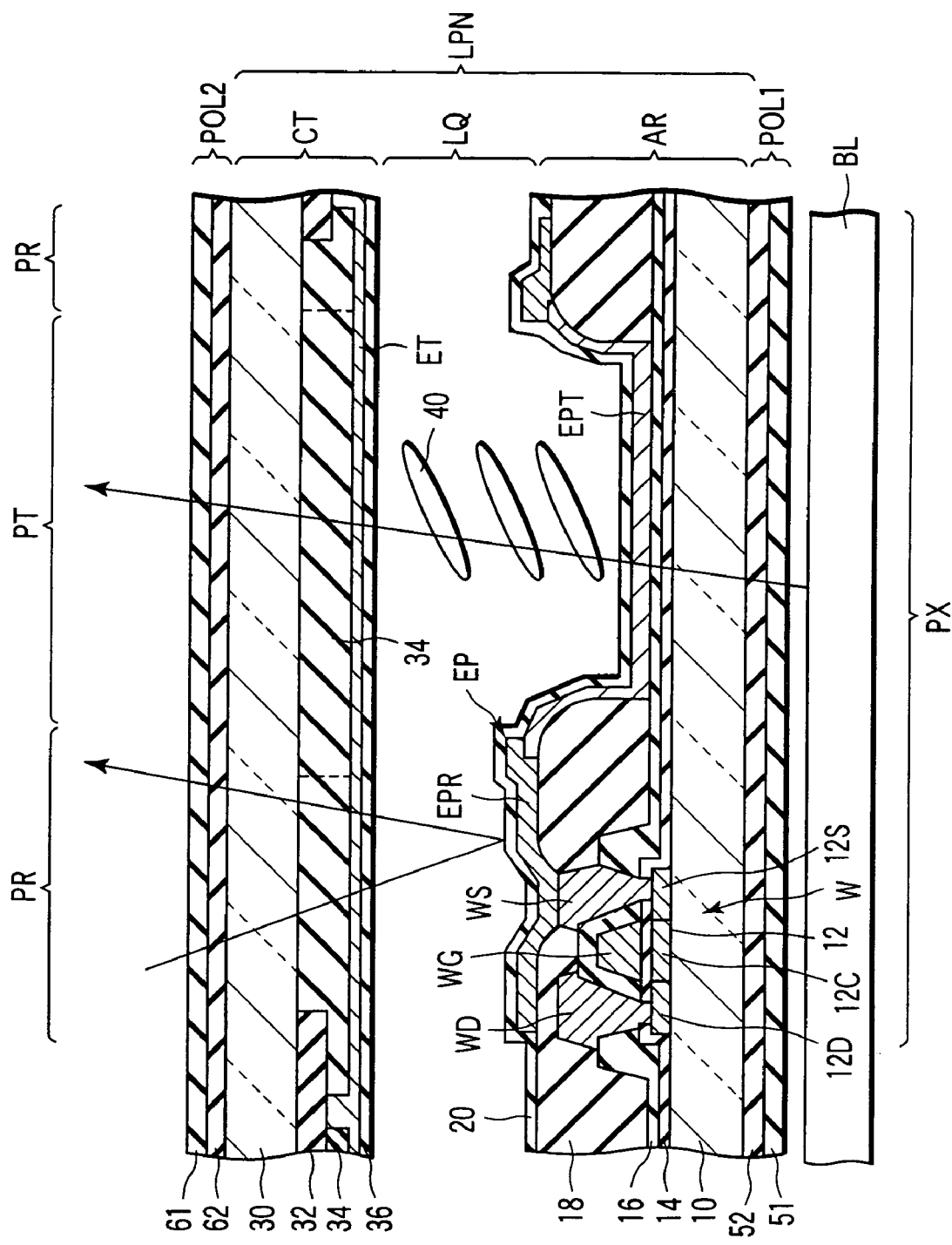
FIG. 2 schematically shows a cross-sectional structure of the liquid crystal display device shown in FIG. 1.

As is shown in FIG. 1 and FIG. 2, the liquid crystal display device is an active-matrix type semi-transmission color liquid crystal display device that includes a liquid crystal display panel LPN. The liquid crystal display panel LPN is configured to include an array substrate (first substrate) AR, a counter-substrate (second substrate) CT that is disposed to face the array substrate AR, and a liquid crystal layer LQ that is held between the array substrate AR and counter-substrate CT.

The liquid crystal display device further includes a first polarization control element POL1 that is provided on an outer surface of the array substrate AR, which is opposed to the surface thereof holding the liquid crystal layer LQ, and a second polarization control element POL2 that is provided on an outer surface of the counter-substrate CT, which is opposed to the surface thereof holding the liquid crystal layer LQ. In addition, the liquid crystal display device includes a backlight unit BL that illuminates the liquid crystal display panel LPN from the first polarization control element POL1 side.

In the liquid crystal display device, a display region DSP that displays an image includes a plurality (m×n) of pixels PX arranged in a matrix. Each pixel PX includes a reflection section PR that displays an image by selectively reflecting ambient light ("reflection display"), and a transmission section PT that displays an image by selectively transmitting backlight from the backlight unit BL ("transmission display").

The array substrate AR is formed using an insulating substrate 10 with light transmissivity, such as a glass substrate or a quartz substrate. Specifically, the array substrate AR includes, within the display region DSP, an (m×n) number of pixel electrodes EP arranged in association with the respective pixels; an n-number of scan lines Y (Y1 to Yn) formed in a row direction of the pixel electrodes EP; an m-number of signal lines X (X1 to Xm) formed in a column direction of the pixel electrodes EP; an (m×n) number of switching elements W (e.g. thin-film transistors) arranged near intersections between the scan lines Y and signal lines X in the respective pixels PX; and auxiliary capacitance lines AY, each of which is capacitive-coupled to the associated pixel electrode EP so as to constitute an auxiliary capacitance CS in parallel to a liquid crystal capacitance CLC.

In a drive circuit region DCT near the display region DSP, the array substrate AR includes at least parts of a scan line driver YD that is connected to the n-number of scan lines Y and a signal line driver XD that is connected to the m-number of signal lines X. The scan line driver YD successively supplies scan signals (drive signals) to the n-number of scan lines Y under the control of a controller CNT. The signal line driver XD supplies video signals (drive signals) to the m-number of signal lines X under the control of the controller CNT at a timing when the switching elements W in each row are turned on by the scan signal. Thereby, the pixel electrodes EP in each row are set at pixel potentials corresponding to the video signals that are supplied via the associated switching elements W.

Each of the switching elements W is an N-channel thin-film transistor and includes a polysilicon semiconductor layer 12 that is disposed on the insulating substrate 10. The polysilicon semiconductor layer 12 includes a source region 12S and a drain region 12D, and a channel region 12C that is sandwiched between the source region 12S and drain region 12D. The polysilicon semiconductor layer 12 is covered with a gate insulation film 14.

A gate electrode WG of the switching element W is connected to the associated scan line Y (or formed integral with the associated scan line Y). The gate electrode WG is disposed on the gate insulation film 14 along with the scan line Y and auxiliary capacitance line AY. The gate electrode WG, scan line Y and auxiliary capacitance line AY are covered with an interlayer insulation film 16.

A source electrode WS and a drain electrode WD of the switching element W are disposed on both sides of the gate electrode WG on the interlayer insulation film 16. The source electrode WS is connected to the associated pixel electrode EP and is put in contact with the source region 12S of the polysilicon semiconductor layer 12. The drain electrode WD is connected to the associated signal line X (or formed integral with the associated signal line X) and is put in contact with the drain region 12D of polysilicon semiconductor layer 12. The source electrode WS, drain electrode WD and signal line X are covered with an organic insulation film 18.

The pixel electrode EP includes a reflective electrode EPR that is provided in association with the reflection section PR, and a transmissive electrode EPT that is provided in association with the transmission section PT. The reflective electrode EPR is disposed on the organic insulation film 18 and is electrically connected to the source electrode WS. The reflective electrode EPR is formed of a metallic film with light reflectivity, such as an aluminum film. The transmissive electrode EPT is disposed on the interlayer insulation film 16 and is electrically connected to the reflective electrode EPR. The transmissive electrode EPT is formed of a metallic film with light transmissivity, such as an indium tin oxide (ITO) film. Pixel electrodes EP associated with all pixels PX are covered with an orientation film 20.

On the other hand, the counter-electrode CT is formed using an insulating substrate 30 with light transmissivity, such as a glass substrate or a quartz substrate. Specifically, the counter-electrode CT includes, in the display region DSP, a black matrix 32 that defines the individual pixels PX, color filters 34 that are disposed in the respective pixels defined by the black matrix 32, and a single counter-electrode ET.

The black matrix 32 is disposed to be opposed to the wires, such as scan lines Y and signal lines X, provided on the array substrate AR. The color filters 34 are formed of color resins of a plurality of colors, for instance, three primary colors of red, blue and green. The red colored resin, blue colored resin and green colored resin are disposed in association with the red pixel, blue pixel and green pixel, respectively.

The color filter 34 may be formed to have different optical densities at the reflection section PR and the transmission section PT. In the reflection section PR, ambient light, which contributes to effecting display, passes through the color filter 34 twice. In the transmission section PT, backlight, which contributes to effecting display, passes through the color filter 34 only once. Thus, in order to adjust the hues in the reflection section PR and transmission section PT, it is preferable to reduce the optical density of the colored resin in the reflection section PR to about half the optical density of the colored resin in the transmission section PT.

The counter-electrode ET is disposed to face the pixel electrodes EP of all pixels PX. The counter-electrode ET is formed of a metallic film with light transmissivity, such as an indium tin oxide (ITO) film. In addition, the counter-electrode ET is covered with an orientation film 36.

When the counter-substrate CT and the array substrate AR are disposed such that the orientation films 20 and 36 face each other, a predetermined gap is provided between both substrates by a spacer (not shown). Specifically, the gap provided in the reflection section PR is about half the gap in the transmission section PT. In this embodiment, the gap in the reflection section PR is set at about 2.8 μm, and the gap in the transmission section PT is set at about 4.8 μm.

The liquid crystal layer LQ is formed of a liquid crystal composition including liquid crystal molecules 40, which is sealed in the gap between the orientation film 20 of the array substrate AR and the orientation film 36 of the counter-substrate CT. In this embodiment, MJ012166 (manufactured by Merck & Co., Δn=0.061) is used as the liquid crystal composition, and the twist angle of liquid crystal molecules 40 is set at 0 deg.

Each of the first polarization control element POL1 and second polarization control element POL2 controls the polarization state of light that passes therethrough. To be more specific, the first polarization control element POL1 controls the polarization state of light that passes therethrough so that light in a polarization state of elliptically polarized light may be incident on the liquid crystal layer LQ. Thus, the polarization state of backlight, which is incident on the first polarization control element POL1, is changed to elliptic polarization while the backlight passes through the first polarization control element POL1. The backlight, which emanates from the first polarization control element POL1, enters the liquid crystal layer LQ while maintaining the elliptically polarized state.

Similarly, the second polarization control element POL2 controls the polarization state of light that passes therethrough so that light in a polarization state of elliptically polarized light may be incident on the liquid crystal layer LQ. Thus, the polarization state of ambient light, which is incident on the second polarization control element POL2, is changed to elliptic polarization while the ambient light passes through the second polarization control element POL2. The ambient light, which emanates from the second polarization control element POL2, enters the liquid crystal layer LQ while maintaining the elliptically polarized state.

The first polarization control element POL1 comprises at least one first polarizer plate 51 and at least one first phase plate 52. The second polarization control element POL2 comprises at least one second polarizer plate 61 and at least one second phase plate 62. Each of the first phase plate 52 and second phase plate 62 is a so-called ¼ wavelength plate that provides a phase difference of ¼ wavelength between an ordinary ray and an extraordinary ray with respect to light of a predetermined wavelength.

The polarizer plate used in this embodiment has an absorption axis and a transmission axis, which are perpendicular to each other, in a plane that intersects at right angles with the direction of travel of light. The polarizer plate extracts light with a plane of vibration in one direction parallel to the transmission axis, from light with planes of vibration in random directions. That is, the polarizer plate extracts light in a linearly polarized state.

The phase plate used in this embodiment has a slow axis and a fast axis that intersect at right angles. In discussion of birefringence, the slow axis corresponds to an axis with a relatively high refractive index, and the fast axis corresponds to an axis with a relatively low refractive index. It is assumed that the slow axis agrees with a plane of vibration of an ordinary ray, and the fast axis agrees with a plane of vibration of an extraordinary ray. A retardation value Δn·d (nm) of the phase plate is defined by $$(ne \cdot d - no \cdot d) \text{ (i.e. } \Delta n = ne - no)$$

where no is the refractive index of the ordinary ray, ne is the refractive index of the extraordinary ray, and d is the thickness of the phase plate in the direction of travel of light.

In the description below, the positions of the polarizer plates 51 and 61 are specified by an absorption axis 51T and an absorption axis 61T, respectively. The positions of the phase plates 52 and 62 are specified by slow axes 52D and 62D, respectively.

Figure 3:
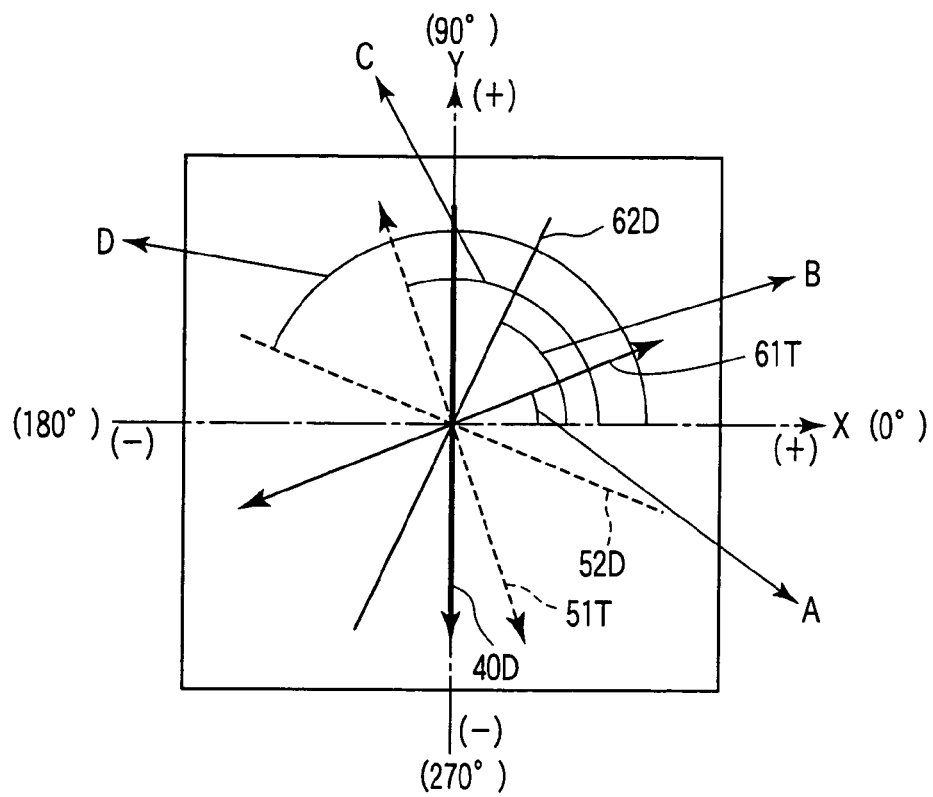
FIG. 3 is a view for explaining a positional relationship between a director of liquid crystal molecules, absorption axes of first and second polarizer plates, and slow axes of first and second phase plates in the liquid crystal display device shown in FIG. 2.

As is shown in FIG. 3, when the liquid crystal display device according to the present embodiment is viewed from the counter-substrate side, an X axis and a Y axis, which intersect at right angles, are defined, for the sake of convenience, in a plane parallel to the major surface of the array substrate AR (or counter-substrate CT). The X axis corresponds to the horizontal direction of the screen, and the Y axis corresponds to the vertical direction of the screen. A positive (+) direction on the X axis (i.e. 0° azimuth) corresponds to the right side of the screen, and a negative (−) direction on the X axis (i.e. 180° azimuth) corresponds to the left side of the screen. In addition, a positive (+) direction on the Y axis (i.e. 90° azimuth) corresponds to the upper side of the screen, and a negative (−) direction on the Y axis (i.e. 270° azimuth) corresponds to the lower side of the screen.

In the case where the liquid crystal layer LQ is formed of a liquid crystal composition including homogeneously oriented liquid crystal molecules 40, a director 40D of liquid crystal molecules 40 (longitudinal direction of liquid crystal molecules 40) is set in parallel to the Y axis. When the X axis is used as a reference axis (i.e. the positive (+) direction on the X axis is set at a 0° azimuth), the director 40D is set at a 270° azimuth.

Figure 4:
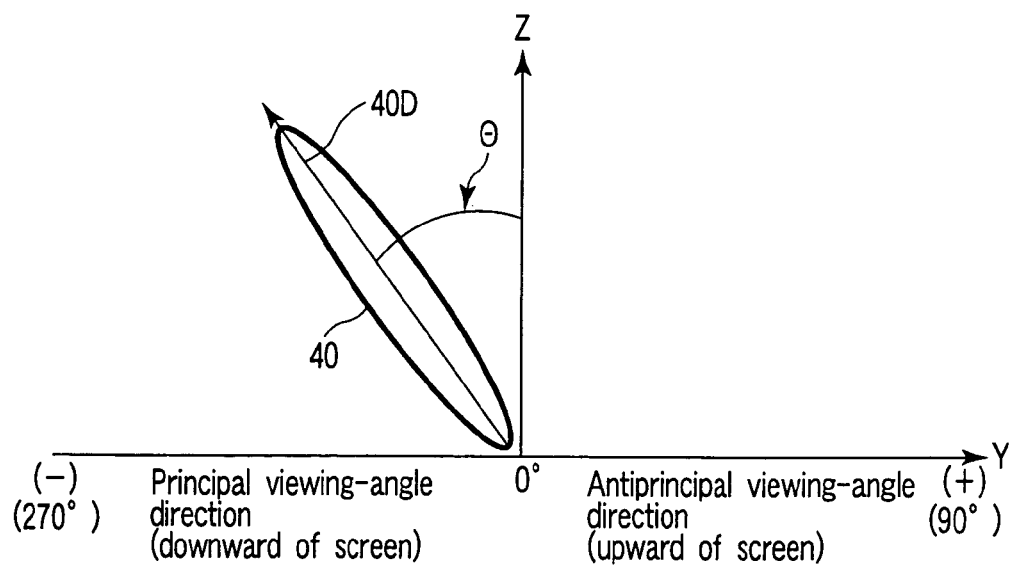
FIG. 4 is a view for explaining the viewing-angle dependency of contrast.

Now assume, as is shown in FIG. 4, that in an Y-Z plane including a normal line Z and the Y axis of the liquid crystal display panel, an angle Θ (deg) formed between the normal line Z and a given line, which is inclined toward the positive (+) direction on the Y axis from the normal line Z, is a positive (+) angle, and an angle Θ (deg) formed between the normal line Z and a given line, which is inclined toward the negative (−) direction on the Y axis from the normal line Z, is a negative (−) angle. In this case, an angle Θ formed between the director 40D of the liquid crystal molecule 40 and the normal line Z is present in the negative range. Further, assume that the angle range in which the director 40D of liquid crystal molecule 40 is present, that is, the range of angle Θ between 0° and −90°, is referred to as a principal viewing-angle direction (i.e. the lower side of the screen), and the angle range in which the director 40D of liquid crystal molecule 40 is not present, that is, the range of angle Θ between 0° and +90°, is referred to as a anti-principal viewing-angle direction (i.e. the upper side of the screen).

In this case, the second polarizer plate 61 is disposed at an angle A (deg) that is defined between the absorption axis 61T of the second polarizer plate 61 and the X axis. The second phase plate 62 is disposed at an angle B (deg) that is defined between the slow axis 62D of the second phase plate 62 and the X axis. The first polarizer plate 51 is disposed at an angle C (deg) that is defined between the absorption axis 51T of the first polarizer plate 51 and the X axis. The first phase plate 52 is disposed at an angle D (deg) that is defined between the slow axis 52D of the first phase plate 52 and the X axis.

Next, referring to FIG. 4, a mechanism of occurrence of viewing-angle dependency of contrast is described.

When the line of sight is inclined towards the principal viewing-angle direction from a direction parallel to the normal line Z of the liquid crystal display panel, the apparent Δn of the liquid crystal molecule 40 decreases. Consequently, the retardation value Δn·d (i.e. a product of Δn of the liquid crystal layer and cell gap d) of the liquid crystal layer in the case of viewing in the principal viewing-angle direction becomes less than in the case of viewing in the direction of the normal line Z. This is visually recognizable as a phenomenon in which the luminance of white (in particular, gray level) will sharply decrease as the line of sight is inclined towards the principal viewing-angle direction from the direction of the normal line Z of the liquid crystal display panel.

On the other hand, the retardation value of the liquid crystal layer in the case of viewing in the anti-principal viewing-angle direction becomes greater than in the case of viewing in the direction of the normal line Z. This is visually recognizable as a phenomenon in which the luminance of black will sharply increase as the line of sight is inclined towards the anti-principal viewing-angle direction from the direction of the normal line Z of the liquid crystal display panel.

As described above, when the viewing angle is varied in the range of angle Θ between the upper and lower sides of the screen, the retardation value Δn·d exhibits different variations between the upper and lower sides of the screen, and different phenomena occur with respect to the display performance. When the display device is applied to the mobile phone, there is a strong demand for improvement in the decrease in luminance of white in the principal viewing-angle direction. On the other hand, when the viewing angle is varied in the right-and-left direction of the screen, the retardation value Δn·d varies symmetrically in the right-and-left direction and the ratio of variation is not so high. Thus, there is no particular demand for improvement in this case.

In order to increase the viewing angle in the upper and lower directions of the screen, it is necessary to optically compensate the retardation value Δn·d of the liquid crystal layer, which sharply varies in the upper and lower directions of the screen. In other words, in the principal viewing-angle direction in which the retardation value Δn·d gradually decreases, it is necessary to perform optical compensation using light in a polarized state with a high ellipticity (=minor-axis direction amplitude/major-axis direction amplitude) (i.e. polarization state close to circular polarization). Conversely, in the anti-principal viewing-angle direction in which the retardation value Δn·d gradually increases, it is necessary to perform optical compensation using light in a polarized state with a low ellipticity (i.e. polarization state close to linear polarization). In theory, the viewing-angle dependency can be improved by realizing such optical compensation that the ellipticity of elliptically polarized light, which is incident on the liquid crystal display panel in the principal viewing-angle direction, may become greater than the ellipticity of elliptically polarized light, which is incident in the anti-principal viewing-angle direction.

Specifically, the ellipticity of elliptically polarized light can be controlled by adjusting the settings of the first polarization control element POL1 and second polarization control element POL2 with reference to the director 40D of the liquid crystal molecule 40. Therefore, a polarization state with a desired ellipticity can be created by optimizing at least one of the first polarization control element POL1 and second polarization control element POL2.

To be more specific, as a method for realizing the above-described optical compensation, it can be thought that an acute angle between the absorption axis of the polarizer plate and the slow axis of the phase plate, which constitute each polarization control element, is set in a range between 25° and 70°. By this optimization, the ellipticity of elliptically polarized light that is incident on the liquid crystal panel LPN can be set to become relatively large in the principal viewing-angle direction and relatively small in the anti-principal viewing-angle direction. Thereby, the viewing angle of the screen can dramatically be widened. In addition, by setting the acute angle between the absorption axis of the polarizer plate and the slow axis of the phase plate in the above-described range, the polarization state with an ellipticity in a predetermined range can be created with respect to light in the range of all wavelengths that are used for color display, for instance, a range between 450 nm and 650 nm. Furthermore, elliptically polarized light with a substantially uniform ellipticity can be used. Thereby, it becomes possible to prevent degradation in optical characteristics due to the wavelength dependency of the retardation value in the phase plate.

Figure 5:
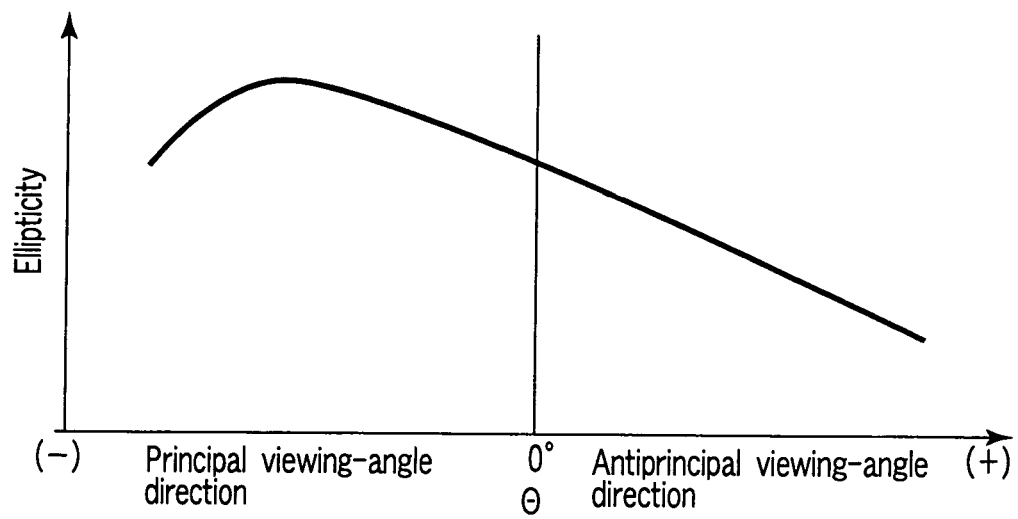
FIG. 5 shows an example of an ideal ellipticity distribution.

Ideally, it is preferable to create an ellipticity distribution, as shown in FIG. 5, by means of each polarization control element. That is, it is preferable that the ellipticity distributions be asymmetric between the principal viewing-angle direction and anti-principal viewing-angle direction, when the normal line Z is set as a reference ($\Theta=0°$). To be more specific, as regards the ellipticity distribution, in the case of the angles $\Theta$ having the same absolute value, the ellipticity of elliptically polarized light that is incident in the principal viewing-angle direction is generally different from the ellipticity of elliptically polarized light that is incident in the anti-principal viewing-angle direction. In addition, as regards the ellipticity distribution, in the case of the angles $\Theta$ having the same absolute value, it is preferable that the ellipticity in the principal viewing-angle direction be set to be generally greater than the ellipticity in the anti-principal viewing-angle direction. Thereby, it becomes possible to effectively optically compensate the retardation value $\Delta n \cdot d$ of the liquid crystal layer in the upper side and lower side of the screen, thereby enhancing viewing-angle characteristics.

Further, as regards the above-described ellipticity distribution, it is preferable that the ellipticity have a maximum value in the principal viewing-angle direction. That is, in the principal viewing-angle direction in which the director 40D of liquid crystal molecule 40 is present, it is preferable to create a polarization state with an ellipticity that is higher than the ellipticity in the normal direction (i.e. in the front direction) and is close to the ellipticity of a circular polarization state. Specifically, it is preferable that the ellipticity take a maximum value in the vicinity of the angle $\Theta$ that corresponds to the direction of the director 40D in which the retardation value $\Delta n \cdot d$ takes a minimum value. Thereby, the viewing-angle characteristics of the screen can further be enhanced.

In particular, in order to increase the viewing angle on the lower side of the screen, it is preferable to perform optical compensation by elliptical polarization with an ellipticity of 0.45 or more, at least in the range of the angle $\Theta$ of 0° to −80° in the principal viewing-angle direction, preferably in the whole range of the angle $\Theta$ of 0° to −90° in the principal viewing-angle direction. If elliptically polarized light with such a degree of ellipticity is used, the retardation value in the liquid crystal layer can effectively be compensated. In particular, it is possible to sufficiently improve the viewing-angle dependency of contrast in the principal viewing-angle direction in transmission display.

Next, referring back to FIG. 2, a detailed description is given of the operations in reflection display and transmission display in a semi-transmission type liquid crystal display device whose display mode is a normally white mode.

Light, which passes through the liquid crystal layer LQ in the reflection section PR, behaves in the following manner in a voltage-off state in which no potential difference is applied to the liquid crystal layer LQ. Incident ambient light from the counter-substrate CT side passes through the second polarization control element POL2 and is converted to polarized light that is, for example, elliptically polarized clockwise. The elliptically polarized light enters the liquid crystal layer LQ via the counter-substrate CT. While passing through the liquid crystal layer LQ, the elliptically polarized light is provided with a phase difference of $\pi/2$, and reaches the reflective electrode EPR. Reflective light from the reflective electrode EPR is given a phase difference of $\pi$ at this point of time. While passing through the liquid crystal layer LQ, the reflective light is provided with a phase difference of $\pi/2$ once again. In short, a phase difference of $2\pi$ is imparted to the elliptically polarized light, which has traveled through the liquid crystal layer LQ in the forward and backward directions. Accordingly, the reflective light from the reflection section PR passes through the counter-substrate CT while maintaining the state of clockwise elliptically polarized light. Since the elliptically polarized light can pass through the second polarization control element POL2, it contributes to single-color light display corresponding to the color of the color filter 34.

On the other hand, light, which passes through the liquid crystal layer LQ in the reflection section PR, behaves in the following manner in a voltage-on state in which a potential difference is applied to the liquid crystal layer LQ. Like the voltage-off state, incident ambient light from the counter-substrate CT side passes through the second polarization control element POL2 and is converted to polarized light that is, for example, elliptically polarized clockwise. The elliptically polarized light enters the liquid crystal layer LQ via the counter-substrate CT. When the residual retardation in the liquid crystal layer LQ at the voltage-on time is 0, the elliptically polarized light undergoes no effect of a phase difference while passing through the liquid crystal layer LQ. Thus, the elliptically polarized light reaches the reflective electrode EPR in the unchanged polarized state. Reflective light from the reflective electrode EPR is given a phase difference of $\pi$ at this point of time, similarly with the above-described case. While passing through the liquid crystal layer LQ once again, the reflective light undergoes no effect of a phase difference. Hence, a phase difference of $\pi$ is imparted to the elliptically polarized light, which has traveled through the liquid crystal layer LQ in the forward and backward directions. Accordingly, the reflective light from the reflection section PR passes through the counter-substrate CT in the state of counterclockwise elliptically polarized light. This elliptically polarized light does not pass through the second polarization control element POL2. Thus, dark display, that is, black display, is effected.

In the case where a voltage is applied to the liquid crystal layer LQ, liquid crystal molecules at an interface of the substrate are not completely erected due to anchoring forces. Consequently, in usual cases, the residual retardation in the liquid crystal layer LQ at the voltage-on time is not 0, but is several to several-ten nm. In this case, if the retardation value of the second phase plate 62 of the second polarization control element POL2 is decreased by a degree corresponding to the residual retardation of the liquid crystal layer LQ, the polarized state of light that reaches the reflective electrode EPR becomes equal to the state in the case where the residual retardation in the liquid crystal layer LQ is 0. Therefore, black display can be executed with the same mechanism as described above.

As has been described above, in the reflection section PR, ambient light is selectively reflected to display an image.

Light, which passes through the liquid crystal layer LQ in the transmission section PT, behaves in the following manner in a voltage-off state. Backlight emitted from the backlight unit BL passes through the first polarization control element POL1 and is converted to polarized light that is, for example, elliptically polarized counterclockwise. The elliptically polarized light enters the liquid crystal layer LQ via the array substrate AR. While passing through the liquid crystal layer LQ at the transmission section PT having about double the gap of the reflection section PR, the elliptically polarized light is provided with a phase difference of $\pi$. That is, the light, which has passed through the transmission section PT, is converted to clockwise elliptically polarized light, and the elliptically polarized light passes through the counter-substrate CT. Since the elliptically polarized light can pass through the second polarization control element POL2, it contributes to single-color light display corresponding to the color of the color filter 34.

On the other hand, light, which passes through the liquid crystal layer LQ in the transmission section PT, behaves in the following manner in a voltage-on state. Like the voltage-off state, incident backlight from the array substrate AR side passes through the first polarization control element POL1 and is converted to polarized light that is, for example, elliptically polarized counterclockwise. The elliptically polarized light enters the liquid crystal layer LQ via the array substrate AR. When the residual retardation in the liquid crystal layer LQ at the voltage-on time is 0, the elliptically polarized light undergoes no effect of a phase difference while passing through the liquid crystal layer LQ. Thus, the elliptically polarized light passes through the counter-substrate CT in the unchanged polarized state. This elliptically polarized light does not pass through the second polarization control element POL2. Thus, dark display, that is, black display, is effected.

As has been described above, in the transmission section PT, backlight is selectively transmitted to display an image.

FIRST EMBODIMENT

Figure 6:
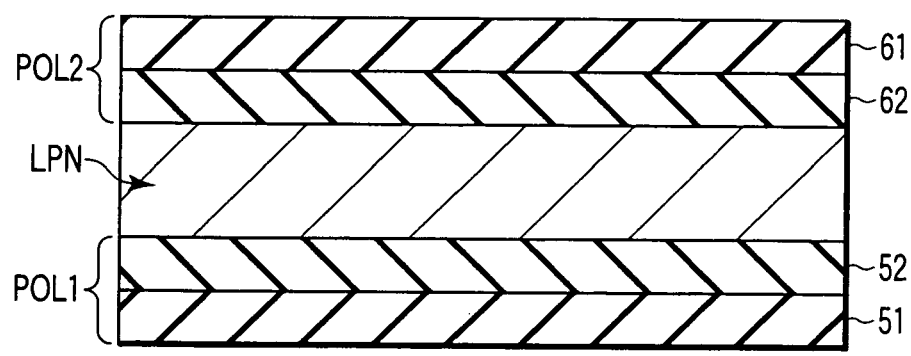
FIG. 6 schematically shows the structure of a liquid crystal display device according to a first embodiment of the invention.

A first embodiment of the present invention will now be described. In a semi-transmission type liquid crystal display device according to the first embodiment, as shown in FIG. 6, a first polarization control element POL1, which is provided on the array substrate side of a liquid crystal display panel LPN, comprises one first polarizer plate 51 and one first phase plate (uniaxial ¼ wavelength plate) 52. A second polarization control element POL2, which is provided on the counter-substrate side of the liquid crystal display panel LPN, comprises one second polarizer plate 61 and one second phase plate (uniaxial ¼ wavelength plate) 62.

As regards the liquid crystal display panel LPN, the liquid crystal composition of the liquid crystal layer and the gaps in the transmission section and reflection section are the same as those described above.

In the first embodiment, the first polarization control element POL1 and second polarization control element POL2 are optimized, and an acute angle formed between the absorption axis of the polarizer plate and the slow axis of the phase plate is set in a range of 25° to 70°. Specifically, as shown in FIG. 7, the formed angle A is 0° and the formed angle B is 36°. Accordingly, an acute angle θ2 formed between the absorption axis 61T of the second polarizer plate 61 and the slow axis 62D of the second phase plate 62 is 36°. In addition, the formed angle C is 98°, and the formed angle D is 150.5°. Thus, an acute angle θ1 formed between the absorption axis 51T of the first polarizer plate 51 and the slow axis 52D of the first phase plate 52 is 52.5°. The retardation value (R value) of the first phase plate 52 is 150 nm with respect to light with a wavelength of 550 nm. The retardation value (R value) of the second phase plate 62 is 145 nm with respect to light with a wavelength of 550 nm.

The formed angles A to D and the retardation values of the first phase plate and second phase plate vary depending on retardation values in a voltage-off state in which no potential difference is applied between the pixel electrode EP and counter-electrode ET of the liquid crystal display panel LPN, or residual retardation values in a voltage-on state in which a potential difference is applied between the pixel electrode EP and counter-electrode ET. Thus, these values are not limited to those shown in FIG. 7.

The optical characteristics of the liquid crystal display device according to the first embodiment with the above-described structure were measured. Optical characteristics were similarly measured with respect to Comparative Example 1 of a semi-transmission type liquid crystal display device wherein a polarization control element comprising one polarizer plate and two kinds of phase plates (½ wavelength plate and ¼ wavelength plate) is provided on each of outer surfaces of a liquid crystal display panel.

As shown in FIG. 8, the device of Comparative Example 1 is configured such that an ellipticity of 0.88 is obtained with respect to light with a wavelength of 550 nm, and substantially equal ellipticities are obtained in a wavelength range of 450 nm to 650 nm. The device according to the first embodiment is configured such that an ellipticity of 0.75 is obtained with respect to light with a wavelength of 550 nm, and substantially equal ellipticities are obtained in a wavelength range of 450 nm to 650 nm.

The reflection sections in Comparative Example 1 and the first embodiment have the following optical characteristics. In Comparative Example 1, the reflection section had a reflectance of 7%. In the first embodiment, too, the reflection section had a reflectance of 6.98%, which is substantially equal to the reflectance in Comparative Example 1. The measured reflectance corresponds to a ratio of the intensity of reflective light from the reflection section to the intensity of white ambient light (incident light) that is made incident from the counter-substrate side of the liquid crystal display device. The reflectance was measured by means of a reflectometer CM-508D (manufactured by MINOLTA). The incident light is diffuse light that is incident in a direction substantially perpendicular to the counter-substrate (normal direction of the counter-substrate). The intensity of reflective light was measured by a detector that was disposed at a position with an inclination of 8° from the normal line of the counter-substrate.

In Comparative Example 1, the reflection section had a contrast of 25. In the first embodiment, the reflection section had a contrast of 15, which is in a tolerable range. In Comparative Example 1, the hue of white of an image displayed on the reflection section was (0.319, 0.339) on the chromaticity coordinates. In the first embodiment, the hue of white was (0.321, 0.341) on the chromaticity coordinates, and was substantially equal to that in Comparative Example 1.

On the other hand, the transmission sections in Comparative Example 1 and the first embodiment have the following optical characteristics. In Comparative Example 1, the transmission section had a transmittance of 4.4%. In the first embodiment, too, the transmission section had a substantially equal transmittance of 4.4%. The measured transmittance corresponds to a ratio of the intensity of transmission light emanating from the transmission section to the intensity of white backlight (incident light) that is made incident from the array substrate side of the liquid crystal display device. The transmittance was measured by means of a transmissiometer BM-5A (manufactured by TOPCON Corp.) The incident light is diffuse light that is incident in a direction substantially perpendicular to the array substrate (normal direction of the array substrate). The intensity of transmission light was measured by a detector that was disposed at a position with an inclination of 8° from the normal line of the counter-substrate.

In Comparative Example 1, the transmission section had a contrast of 136. In the first embodiment, the transmission section had a contrast of 113. The contrast at the reflection section and transmission section was measured by a measuring device BM-5A (manufactured by TOPCON Corp.) in a darkroom.

In Comparative Example 1, the hue of white of an image displayed on the transmission section was (0.303, 0.327) on the chromaticity coordinates. In the first embodiment, the hue of white was (0.310, 0.330) on the chromaticity coordinates, and was substantially equal to that in Comparative Example 1. The hue at the reflection section and transmission section was measured as chromaticity coordinates values in parallel with the measurements using the above-mentioned measuring devices.

In the present embodiment, importance is placed on the improvement in optical characteristics of the transmission section, in particular, improvement in the viewing-angle dependency of contrast in the transmission section.

FIG. 9 and FIG. 10 show simulation results of ellipticity distributions in the principal viewing-angle direction and anti-principal viewing-angle direction in the liquid crystal display devices according to Comparative Example 1 and the first embodiment, respectively. As is clear from comparison between FIG. 9 and FIG. 10, in the first embodiment, the ellipticity of elliptically polarized light was successfully increased on the lower side of the screen, i.e. in the principal viewing-angle direction. That is, elliptically polarized light with an ellipticity of 0.45 or more was obtained in the entire region in the principal viewing-angle direction. Moreover, the variation in the ellipticity distribution in the principal viewing-angle direction was made gentler. Thereby, elliptically polarized light, which is incident on the liquid crystal display panel LPN in the principal viewing-angle direction, was made close to circularly polarized light. Compared to Comparative Example 1, the retardation value of the liquid crystal layer in the principal viewing-angle direction can effectively be optically compensated.

Figure 11:
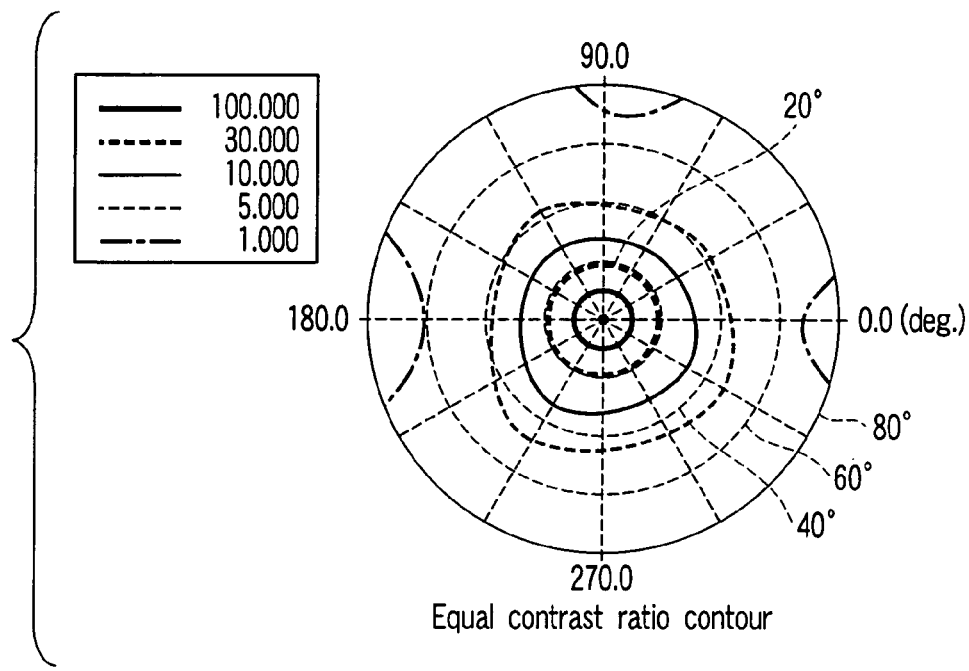
FIG. 11 is a characteristic diagram illustrating the viewing-angle dependency of contrast in the liquid crystal display device according to Comparative Example 1.
Figure 12:
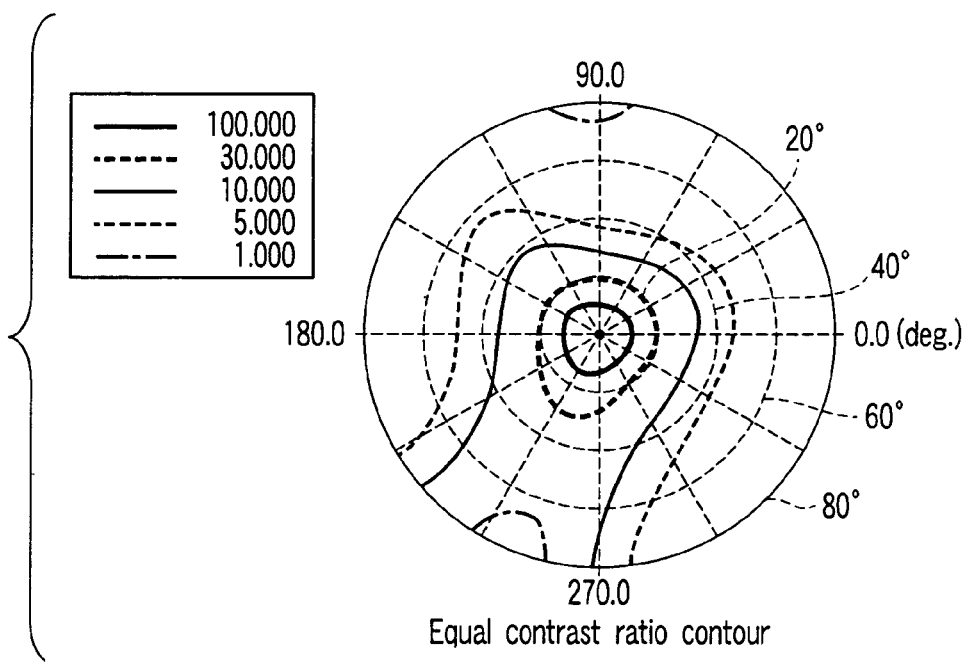
FIG. 12 is a characteristic diagram illustrating the viewing-angle dependency of contrast in the liquid crystal display device according to the first embodiment.

FIG. 11 and FIG. 12 are characteristic diagrams that simulate the viewing-angle dependency of contrast in the transmission sections of the liquid crystal display devices according to Comparative Example 1 and the first embodiment, respectively. In the characteristic diagrams, the center corresponds to the normal direction of the liquid crystal display panel. A 0 (deg) azimuth corresponds to the positive (+) direction on the X axis. A 180 (deg) azimuth corresponds to a negative (−) direction on the X axis. A 90 (deg) azimuth corresponds to a positive (+) direction on the Y axis (i.e. the upper side of the screen: anti-principal viewing-angle direction). A 270 (deg) azimuth corresponds to a negative (−) direction on the Y axis (i.e. the lower side of the screen: principal viewing-angle direction). Concentric circles defined about the normal direction indicate angles of inclination to the normal line, and correspond to 20°, 40°, 60° and 80°, respectively. These characteristic diagrams were prepared by plotting angles at which the contrast is equal in the respective directions.

As is clear from comparison between FIG. 11 and FIG. 12, in the first embodiment, the viewing-angle dependency of contrast was improved in the upper and lower directions of the screen. In particular, it was confirmed that a decrease in contrast in the principal viewing-angle direction was improved. The reason for this is that the ellipticity of elliptically polarized light that is incident on the liquid crystal display panel was improved and the retardation value of the liquid crystal layer was compensated, as described above with reference to FIG. 10.

In the first embodiment, a ZEONOR film (manufactured by Sumitomo Chemical Co., Ltd. and Nitto Denko Corp.), which is a uniaxial ¼ wavelength plate, was used as each of the phase plates 52 and 62. Alternatively, another similar uniaxial ¼ wavelength plate, such as an ESCENA film (manufactured by Sekisui Chemical Co., Ltd.) or an ARTON film (manufactured by Sumitomo Chemical Co., Ltd. and Nitto Denko Corp.), may be used. If a biaxial phase plate, such as a PC film (manufactured by Nitto Denko Corp.), is used, a decrease in luminance in the principal viewing-angle direction can be more improved. In this case, it is preferable to use a biaxial phase plate with an Nz coefficient of 0 to 0.7. The Nz coefficient is a value defined by $Nz=(nx-nz)/(nx-ny)$, where nx and ny are refractive indices in azimuths, which intersect at right angles with each other in a plane of the phase plate, and nz is a refractive index in a normal-line direction of the phase plate.

According to the first embodiment, the polarization control element provided on each of the array substrate and the counter-substrate is configured to comprise one polarizer plate and one phase plate. Thereby, the number of phase plates can be decreased, the thickness of each polarization control element can be reduced, and the thickness of the entire device can be decreased. Moreover, the manufacturing cost can be reduced.

Even in the case of using the polarization control element in which the number of phase plates is reduced, the absorption axis of the polarizer plate and the slow axis of the phase plate are set at optimal angles relative to the director of liquid crystal molecules. Thereby, good optical characteristics can be realized. In particular, the viewing-angle dependency of contrast can be improved.

SECOND EMBODIMENT

A second embodiment of the invention will now be described. The above-described semi-transmission type liquid crystal display device may be configured such that at least one of the first polarization control element POL1 and second polarization control element POL2 includes a liquid crystal film in which liquid crystal molecules are hybrid-oriented. From the standpoint of improving the viewing-angle dependency of contrast in transmission display, it is preferable that at least the first polarization control element POL1 include a liquid crystal film, thereby to optimize the polarization state of elliptically polarized light that is just about to enter the liquid crystal display panel LPN.

Figures 13, 14:
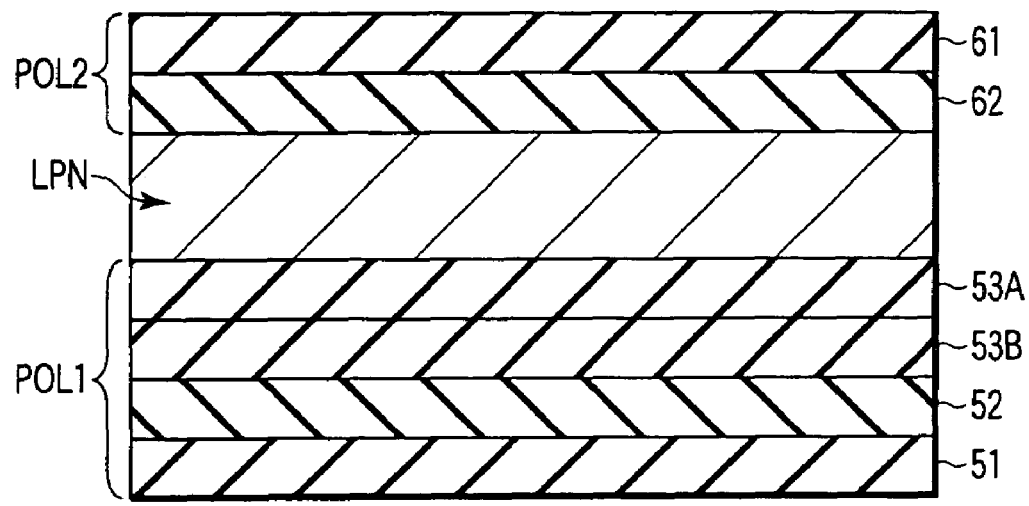
FIG. 13 schematically shows the structure of a liquid crystal display device according to a second embodiment of the invention.
FIG. 14 shows examples of angles of absorption axes and slow axes to the X axis in first and second polarization control elements that are applied to the second embodiment, and retardation values of first and second phase plates.

Specifically, in the semi-transmission type liquid crystal display device according to the second embodiment, as shown in FIG. 13, the first polarization control element POL1, which is provided on the array substrate side of the liquid crystal display panel LPN, comprises one first polarizer plate 51, one first phase plate (uniaxial ¼ wavelength plate) 52, and two liquid crystal films 53A and 53B that have a viewing-angle increasing function. The second polarization control element POL2, which is provided on the counter-substrate side of the liquid crystal display panel LPN, comprises one second polarizer plate 61 and one second phase plate (uniaxial ¼ wavelength plate) 62. The liquid crystal films 53A and 53B employed in this embodiment are formed by hybrid-orienting liquid crystal molecules having a positive or negative refractive index anisotropy. In this embodiment, WV films (manufactured by Fuji Photo Film Co., Ltd.) are adopted as the liquid crystal films 53A and 53B.

As regards the liquid crystal display panel LPN, the liquid crystal composition of the liquid crystal layer and the gaps in the transmission section and reflection section are the same as those described above.

In the second embodiment, the first polarization control element POL1 and second polarization control element POL2 are optimized, and an acute angle formed between the absorption axis of the polarizer plate and the slow axis of the phase plate is set in a range of 25° to 70°. Specifically, as shown in FIG. 14, the formed angle A is 0° and the formed angle B is 36°. Accordingly, an acute angle θ2 formed between the absorption axis 61T of the second polarizer plate 61 and the slow axis 62D of the second phase plate 62 is 36°. In addition, the formed angle C is 98°, and the formed angle D is 150.5°. Thus, an acute angle θ1 formed between the absorption axis 51T of the first polarizer plate 51 and the slow axis 52D of the first phase plate 52 is 52.5°.

In addition, the first polarization control element POL1 is optimized, and an acute angle formed between the slow axis of the liquid crystal film and the director of liquid crystal molecules is set at 45°. Further, an angle formed between the slow axes of the first liquid crystal film 53A and second liquid crystal film 53B is set at 90°. By this setting, the viewing angle can be increased without degrading optical characteristics on the front side. To be more specific, an angle between the slow axis of the first liquid crystal film 53A, which is disposed on the liquid crystal display panel LPN side, and the X-axis is 225°. An angle between the slow axis of the second liquid crystal film 53B, which is disposed on the first phase plate 52 side, and the X-axis is 315°. Besides, the retardation value (R value) of the first phase plate 52 is 150 nm with respect to light with a wavelength of 550 nm. The retardation value (R value) of the second phase plate 62 is 145 nm with respect to light with a wavelength of 550 nm. The above-mentioned formed angles A to D, the angles of the respective liquid crystal films with respect to the X axis, and the retardation values of the first phase plate and second phase plate are merely examples, and are not limited to the values in FIG. 14.

As regards the liquid crystal display device according to the second embodiment, the optical characteristics were measured in the case of viewing in the front direction, i.e. in the normal direction of the liquid crystal panel. Like the first embodiment, good results, as shown in FIG. 8, were obtained.

Figure 15:
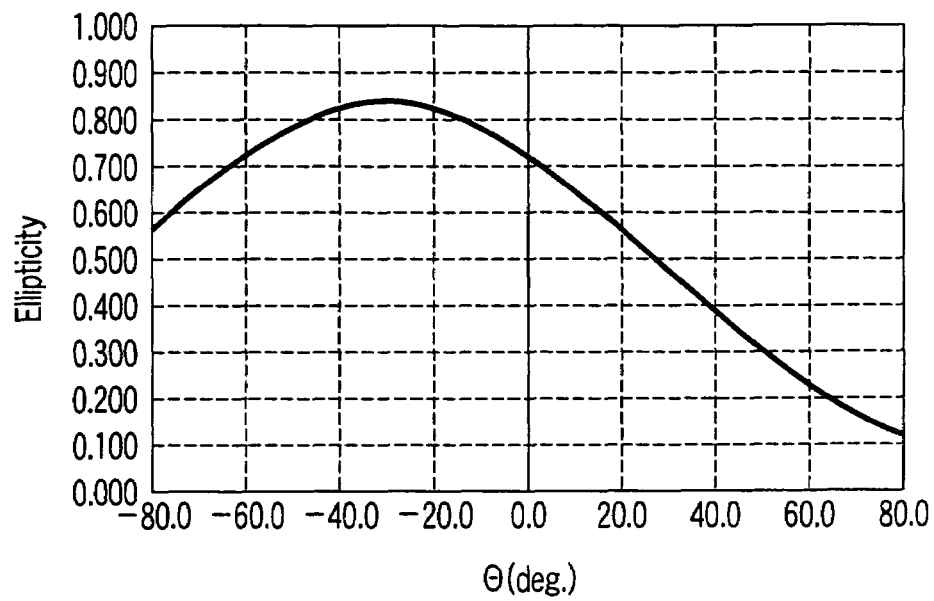
FIG. 15 shows an example of an ellipticity distribution in relation to an angle $\Theta$ to a normal line in the liquid crystal display device according to the second embodiment.

FIG. 15 show a simulation result of ellipticity distributions in the principal viewing-angle direction and anti-principal viewing-angle direction in the liquid crystal display device according to the second embodiment. As is clear from comparison between FIG. 9 and FIG. 15, in the second embodiment, the ellipticity of elliptically polarized light was successfully increased in the principal viewing-angle direction. That is, elliptically polarized light with an ellipticity of 0.45 or more was obtained in the entire region in the principal viewing-angle direction. Moreover, the ellipticity of elliptically polarized light was successfully decreased in the anti-principal viewing-angle direction. These ellipticity distributions are very close to the ideal ones shown in FIG. 5.

Specifically, the ellipticity of elliptically polarized light that is incident in the principal viewing-angle direction of the liquid crystal display panel has a greater ellipticity distribution than the ellipticity of elliptically polarized light that is incident in the anti-principal viewing-angle direction. The ellipticity distributions in the principal viewing-angle direction and anti-principal viewing-angle direction are asymmetric. Furthermore, the ellipticity distribution has a maximum value of ellipticity in the principal viewing-angle direction.

Thereby, elliptically polarized light, which is incident on the liquid crystal display panel LPN in the principal viewing-angle direction, can be made close to circularly polarized light, and elliptically polarized light, which is incident on the liquid crystal display panel LPN in the anti-principal viewing-angle direction, can be made close to linearly polarized light. Compared to Comparative Example 1, the retardation value of the liquid crystal layer can effectively be optically compensated in the principal viewing-angle direction and anti-principal viewing-angle direction.

Figure 16:
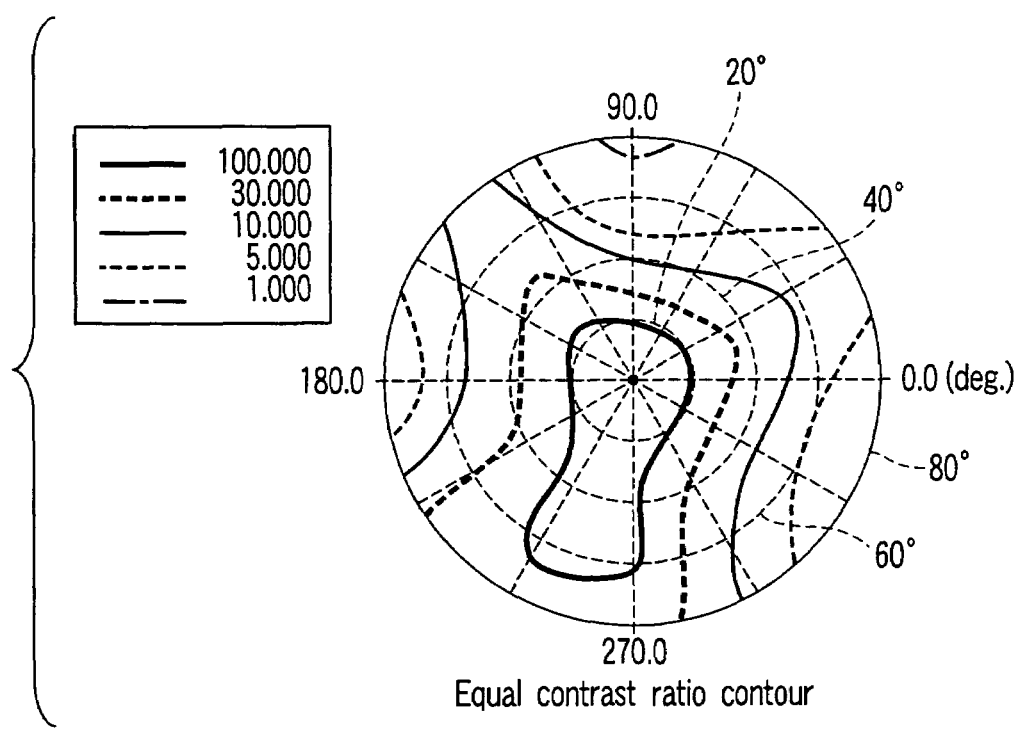
FIG. 16 is a characteristic diagram illustrating the viewing-angle dependency of contrast in the liquid crystal display device according to the second embodiment.

FIG. 16 is a characteristic diagram that simulates the viewing-angle dependency of contrast in the transmission section of the liquid crystal display device according to the second embodiment. As is clear from comparison between FIG. 11 and FIG. 16, in the second embodiment, the viewing-angle dependency of contrast was improved in the upper and lower directions of the screen. In particular, it was confirmed that a decrease in contrast in the principal viewing-angle direction was improved. The reason for this is that the ellipticity of elliptically polarized light that is incident on the liquid crystal display panel LPN is improved and a maximum value of ellipticity is provided in the main viewing-angle direction, as has been described with reference to FIG. 15.

In the second embodiment, too, a ZEONOR film, which is a uniaxial ¼ wavelength plate, was used as each of the phase plates 52 and 62. Alternatively, another similar uniaxial ¼ wavelength plate, such as an ESCENA film or an ARTON film, may be used. If a biaxial phase plate, such as a PC film, is used, a decrease in luminance in the principal viewing-angle direction can be more improved. In this case, it is preferable to use a biaxial phase plate with an Nz coefficient of 0 to 0.7. Besides, the WV films were used as the liquid crystal films having the viewing-angle increasing function. Alternatively, other films with the same function may be adopted.

According to the second embodiment, the polarization control element provided on the counter-substrate side is configured to comprise one polarizer plate and one phase plate, and the polarization control element provided on the array substrate side is configured to comprise one polarizer plate, one phase plate, and inexpensive, relatively thin liquid crystal films. Thereby, the number of phase plates can be decreased, the thickness of each polarization control element can be reduced, and the thickness of the entire device can be decreased. Moreover, the manufacturing cost can be reduced.

Even in the case of using the polarization control element in which the number of phase plates is reduced, the absorption axis of the polarizer plate and the slow axis of the phase plate are set at optimal angles relative to the director of liquid crystal molecules. Moreover, the liquid crystal films with the viewing-angle increasing function are used and the slow axes of the liquid crystal films are set at optimal angles. Thereby, good optical characteristics can be realized. In particular, in transmission display, the viewing angle can be increased in the principal viewing-angle direction and anti-principal viewing-angle direction. The viewing-angle dependency of contrast can thus be improved.

THIRD EMBODIMENT

A third embodiment of the invention will now be described. The above-described semi-transmission type liquid crystal display device may be configured such that at least one of the first polarization control element POL1 and second polarization control element POL2 includes a biaxial phase plate. From the standpoint of improving the viewing-angle dependency of contrast in transmission display, it is preferable that at least the first polarization control element POL1 include a biaxial phase plate, thereby to optimize the polarization state of elliptically polarized light that is just about to enter the liquid crystal display panel LPN.

Figures 17, 18:
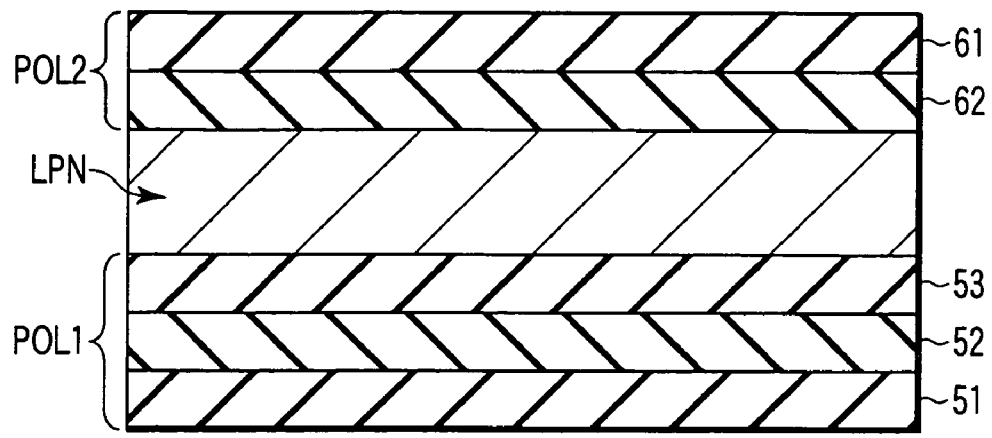
FIG. 17 schematically shows the structure of a liquid crystal display device according to a third embodiment of the invention.
FIG. 18 shows examples of angles of absorption axes and slow axes to the X axis in first and second polarization control elements that are applied to the third embodiment, and retardation values of first and second phase plates.

Specifically, in the semi-transmission type liquid crystal display device according to the third embodiment, as shown in FIG. 17, the first polarization control element POL1, which is provided on the array substrate side of the liquid crystal display panel LPN, comprises one first polarizer plate 51, one first phase plate (biaxial ¼ wavelength plate) 52 that has a viewing-angle increasing function, and one liquid crystal film 53 that has a viewing-angle increasing function. The second polarization control element POL2, which is provided on the counter-substrate side of the liquid crystal display panel LPN, comprises one second polarizer plate 61 and one second phase plate (uniaxial ¼ wavelength plate) 62.

The first phase plate 52 employed in the third embodiment is a PC film (Nz coefficient=0.2) serving as a biaxial phase plate. The second phase plate 62 is a ZEONOR film serving as a uniaxial phase plate. The liquid crystal film 53 is a WV film, like the second embodiment.

As regards the liquid crystal display panel LPN, the liquid crystal composition of the liquid crystal layer and the gaps in the transmission section and reflection section are the same as those described above.

In the third embodiment, the first polarization control element POL1 and second polarization control element POL2 are optimized, and an acute angle formed between the absorption axis of the polarizer plate and the slow axis of the phase plate is set in a range of 25° to 70°. Specifically, as shown in FIG. 18, the formed angle A is 0° and the formed angle B is 36°. Accordingly, an acute angle θ2 formed between the absorption axis 61T of the second polarizer plate 61 and the slow axis 62D of the second phase plate 62 is 36°. In addition, the formed angle C is 100°, and the formed angle D is 154°. Thus, an acute angle θ1 formed between the absorption axis 51T of the first polarizer plate 51 and the slow axis 52D of the first phase plate 52 is 54°.

In addition, the first polarization control element POL1 is optimized, and an acute angle formed between the slow axis of the liquid crystal film and the X axis is set in a range of 20° to 30°. That is, an angle formed between the slow axis of the liquid crystal film 53 and the X axis is 337°. Besides, the retardation value (R value) of the first phase plate 52 is 195 nm with respect to light with a wavelength of 550 nm. The retardation value (R value) of the second phase plate 62 is 145 nm with respect to light with a wavelength of 550 nm. The formed angles A to D, the angle of the liquid crystal film with the X axis and the retardation values of the first phase plate and second phase plate are merely examples, and are not limited to the values in FIG. 18.

As regards the liquid crystal display device according to the third embodiment, the optical characteristics were measured in the case of viewing in the front direction, i.e. in the normal direction of the liquid crystal panel. Like the first embodiment, good results, as shown in FIG. 8, were obtained.

FIG. 19 is a characteristic diagram that simulates the viewing-angle dependency of contrast in the transmission section of the liquid crystal display devices according to the third embodiment. As is clear from comparison between FIG. 11 and FIG. 19, it was confirmed that in the third embodiment the viewing-angle dependency of the screen was improved.

In the third embodiment, in order to optimize the viewing-angle distribution, the direction of rubbing of the liquid crystal cell is rotated by +30° (i.e. the director 40D of the liquid crystal molecule in FIG. 3 is rotated by +30°) and is set at a 300° azimuth. At the same time, the first polarization control element POL1 and second polarization control element POL2 are rotated by +30°.

FIG. 20 shows a simulation result of ellipticity distributions in the principal viewing-angle direction and anti-principal viewing-angle direction in the liquid crystal display device according to the third embodiment, wherein the viewing-angle distribution is optimized. As is clear from comparison between FIG. 9 and FIG. 20, in the third embodiment, the ellipticity of elliptically polarized light was successfully increased in the principal viewing-angle direction. That is, elliptically polarized light with an ellipticity of 0.45 or more was obtained in the entire region in the principal viewing-angle direction. Moreover, the ellipticity of elliptically polarized light was successfully decreased in the anti-principal viewing-angle direction.

Specifically, at least in the range of Θ between −60° and +60°, the ellipticity of elliptically polarized light that is incident in the principal viewing-angle direction of the liquid crystal display panel has a generally greater ellipticity distribution than the ellipticity of elliptically polarized light that is incident in the anti-principal viewing-angle direction. The ellipticity distributions in the principal viewing-angle direction and anti-principal viewing-angle direction are asymmetric. Furthermore, the ellipticity distribution has a maximum value of ellipticity in the principal viewing-angle direction.

Thereby, elliptically polarized light, which is incident on the liquid crystal display panel LPN in the principal viewing-angle direction, can be made close to circularly polarized light, and elliptically polarized light, which is incident on the liquid crystal display panel LPN in the anti-principal viewing-angle direction, can be made close to linearly polarized light. Compared to Comparative Example 1, the retardation value of the liquid crystal layer can effectively be optically compensated in the principal viewing-angle direction and anti-principal viewing-angle direction.

FIG. 21 is a characteristic diagram that simulates the viewing-angle dependency of contrast in the transmission section of the liquid crystal display devices according to the third embodiment, wherein the viewing-angle distribution is optimized. As is clear from comparison between FIG. 11 and FIG. 21, in the third embodiment, the viewing-angle dependency of contrast was improved in the upper and lower directions of the screen. In particular, it was confirmed that a decrease in contrast in the principal viewing-angle direction was improved. The reason for this is that the ellipticity of elliptically polarized light that is incident on the liquid crystal display panel LPN is improved and a maximum value of ellipticity is provided in the main viewing-angle direction, as has been described with reference to FIG. 20.

In the third embodiment, too, the phase plates 52 and 62 and liquid crystal film 53 are not limited to the examples as described above. Alternatively, other films with the same functions may be adopted.

According to the third embodiment, the polarization control element provided on the counter-substrate side is configured to comprise one polarizer plate and one phase plate, and the polarization control element provided on the array substrate side is configured to comprise one polarizer plate, one biaxial phase plate, and an inexpensive, relatively thin liquid crystal film. Thereby, the number of phase plates can be decreased, the thickness of each polarization control element can be reduced, and the thickness of the entire device can be decreased. Moreover, the manufacturing cost can be reduced.

Even in the case of using the polarization control element in which the number of phase plates is reduced, the absorption axis of the polarizer plate and the slow axis of the phase plate are set at optimal angles relative to the director of liquid crystal molecules. Moreover, the biaxial phase plate and the liquid crystal film, which have the viewing-angle increasing functions, are used and the slow axis of the liquid crystal film is set at an optimal angle. Thereby, good optical characteristics can be realized. In particular, in transmission display, the viewing angle can be increased in the principal viewing-angle direction and anti-principal viewing-angle direction. The viewing-angle dependency of contrast can thus be improved.

FOURTH EMBODIMENT

A fourth embodiment of the invention will now be described. The above-described semi-transmission type liquid crystal display device may be configured such that at least one of the first polarization control element POL1 and second polarization control element POL2 includes a liquid crystal film in which liquid crystal molecules are hybrid-oriented. From the standpoint of improving the viewing-angle dependency of contrast in transmission display, it is preferable that at least the first polarization control element POL1 include a liquid crystal film, thereby to optimize the polarization state of elliptically polarized light that is just about to enter the liquid crystal display panel LPN.

Specifically, in the semi-transmission type liquid crystal display device according to the fourth embodiment, as shown in FIG. 22, the first polarization control element POL1, which is provided on the array substrate side of the liquid crystal display panel LPN, comprises one first polarizer plate 51, one first phase plate (uniaxial ¼ wavelength plate) 52, and one liquid crystal film 54 that has a viewing-angle increasing function. The second polarization control element POL2, which is provided on the counter-substrate side of the liquid crystal display panel LPN, comprises one second polarizer plate 61 and one second phase plate (uniaxial ¼ wavelength plate) 62. The liquid crystal film 54 employed in this embodiment is formed such that nematic liquid crystal molecules with positive uniaxiality are hybrid-oriented with no twist as a whole such that a tilt angle on the liquid crystal panel LPN side becomes large and a tilt angle on the first phase plate 52 side becomes small. An NR film (manufactured by Nippon Oil Corp.) is used as the liquid crystal film 54.

As regards the liquid crystal display panel LPN, the liquid crystal composition of the liquid crystal layer and the gaps in the transmission section and reflection section are the same as those described above.

Figures 23, 24:
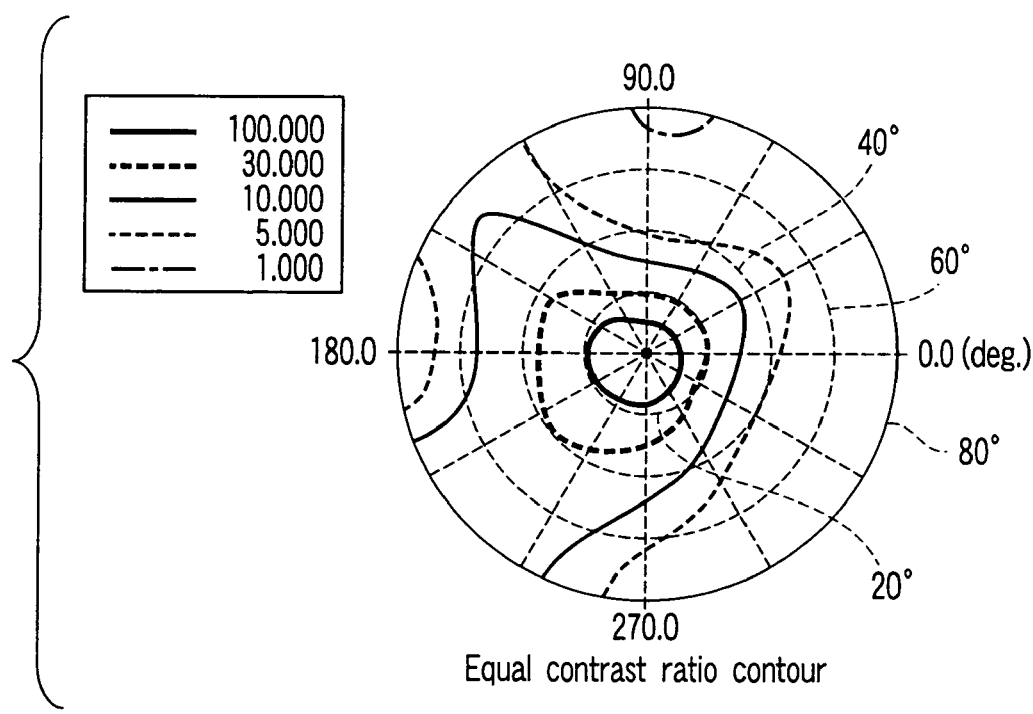
FIG. 23 shows examples of angles of absorption axes and slow axes to the X axis in first and second polarization control elements that are applied to the fourth embodiment, and retardation values of first and second phase plates.
FIG. 24 is a characteristic diagram illustrating the viewing-angle dependency of contrast in the liquid crystal display device according to the fourth embodiment.

In the fourth embodiment, the first polarization control element POL1 and second polarization control element POL2 are optimized, and an acute angle formed between the absorption axis of the polarizer plate and the slow axis of the phase plate is set in a range of 25° to 70°. Specifically, as shown in FIG. 23, the formed angle A is 0° and the formed angle B is 36°. Accordingly, an acute angle θ2 formed between the absorption axis 61T of the second polarizer plate 61 and the slow axis 62D of the second phase plate 62 is 36°. In addition, the formed angle C is 98°, and the formed angle D is 165.5°. Thus, an acute angle θ1 formed between the absorption axis 51T of the first polarizer plate 51 and the slow axis 52D of the first phase plate 52 is 67.5°.

In addition, the first polarization control element POL1 is optimized, and an acute angle formed between the slow axis of the liquid crystal film and the X axis is set in a range of 20° to 70°. That is, an angle formed between the slow axis of the liquid crystal film 54 and the X axis is 148°. Besides, the retardation value (R value) of the first phase plate 52 is 65 nm with respect to light with a wavelength of 550 nm. The retardation value (R value) of the second phase plate 62 is 145 nm with respect to light with a wavelength of 550 nm. The formed angles A to D, the angle of the liquid crystal film with the X axis, and the retardation values of the first phase plate and second phase plate are merely examples, and are not limited to the values in FIG. 23.

As regards the liquid crystal display device according to the fourth embodiment, the optical characteristics were measured in the case of viewing in the front direction, i.e. in the normal direction of the liquid crystal panel. Like the first embodiment, good results, as shown in FIG. 8, were obtained.

FIG. 24 is a characteristic diagram that simulates the viewing-angle dependency of contrast in the transmission section of the liquid crystal display devices according to the fourth embodiment. As is clear from comparison between FIG. 11 and FIG. 24, it was confirmed that in the fourth embodiment the viewing-angle dependency of the screen was improved.

In the fourth embodiment, in order to optimize the viewing-angle distribution, the direction of rubbing of the liquid crystal cell is rotated by +30° (i.e. the director 40D of the liquid crystal molecule in FIG. 3 is rotated by +30°) and is set at a 300° azimuth. At the same time, the first polarization control element POL1 and second polarization control element POL2 are rotated by +30°.

Figure 25:
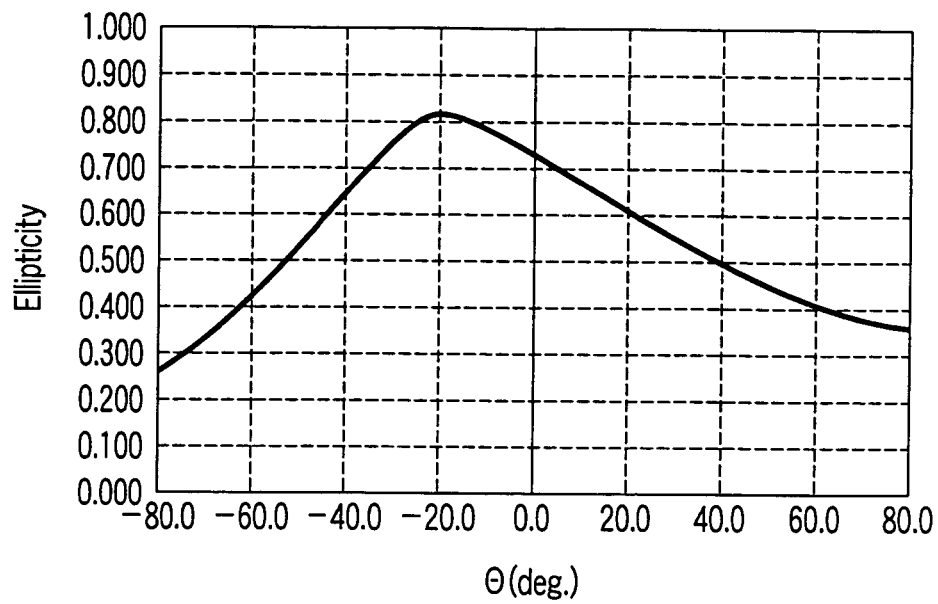
FIG. 25 shows an example of an ellipticity distribution in relation to an angle $\Theta$ to a normal line in the liquid crystal display device according to the fourth embodiment.

FIG. 25 shows a simulation result of ellipticity distributions in the principal viewing-angle direction and anti-principal viewing-angle direction in the liquid crystal display device according to the fourth embodiment, wherein the viewing-angle distribution is optimized. As is clear from comparison between FIG. 9 and FIG. 25, in the fourth embodiment, the ellipticity of elliptically polarized light was successfully increased in the principal viewing-angle direction, and the ellipticity of elliptically polarized light was successfully decreased in the anti-principal viewing-angle direction. These ellipticity distributions are very close to the ideal ones shown in FIG. 5.

Specifically, at least in the range of Θ between −60° and +60°, the ellipticity of elliptically polarized light that is incident in the principal viewing-angle direction of the liquid crystal display panel has a generally greater ellipticity distribution than the ellipticity of elliptically polarized light that is incident in the anti-principal viewing-angle direction. The ellipticity distributions in the principal viewing-angle direction and anti-principal viewing-angle direction are asymmetric. Furthermore, the ellipticity distribution has a maximum value of ellipticity in the principal viewing-angle direction.

Thereby, elliptically polarized light, which is incident on the liquid crystal display panel LPN in the principal viewing-angle direction, can be made close to circularly polarized light, and elliptically polarized light, which is incident on the liquid crystal display panel LPN in the anti-principal viewing-angle direction, can be made close to linearly polarized light. Compared to Comparative Example 1, the retardation value of the liquid crystal layer can effectively be optically compensated in the principal viewing-angle direction and anti-principal viewing-angle direction.

Figure 26:
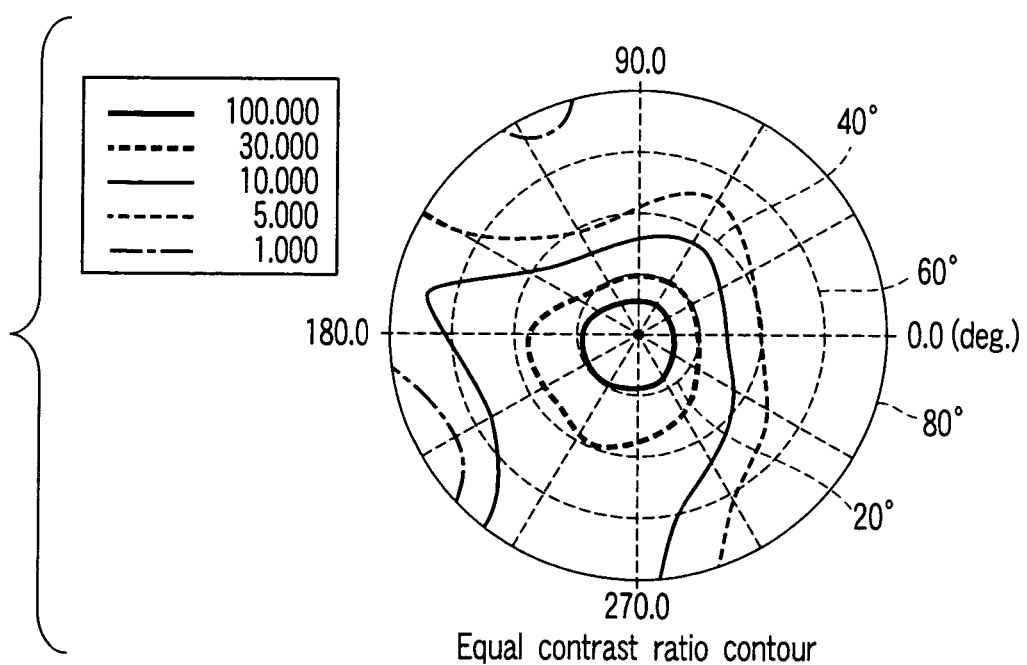
FIG. 26 is a characteristic diagram illustrating an optimized viewing-angle dependency of contrast in the liquid crystal display device according to the fourth embodiment.

FIG. 26 is a characteristic diagram that simulates the viewing-angle dependency of contrast in the transmission section of the liquid crystal display devices according to the fourth embodiment, wherein the viewing-angle distribution is optimized. As is clear from comparison between FIG. 11 and FIG. 26, in the fourth embodiment, the viewing-angle dependency of contrast was improved in the upper and lower directions of the screen. In particular, it was confirmed that a decrease in contrast in the principal viewing-angle direction was improved. The reason for this is that the ellipticity of elliptically polarized light that is incident on the liquid crystal display panel LPN is improved and a maximum value of ellipticity is provided in the main viewing-angle direction, as has been described with reference to FIG. 25.

In the fourth embodiment, too, the phase plates 52 and 62 and liquid crystal film 54 are not limited to the examples as described above. Alternatively, other films with the same functions may be adopted.

According to the fourth embodiment, the polarization control element provided on the counter-substrate side is configured to comprise one polarizer plate and one phase plate, and the polarization control element provided on the array substrate side is configured to comprise one polarizer plate, one phase plate, and one liquid crystal film. Thereby, the number of phase plates can be decreased, the thickness of each polarization control element can be reduced, and the thickness of the entire device can be decreased. Moreover, the manufacturing cost can be reduced.

Even in the case of using the polarization control element in which the number of phase plates is reduced, the absorption axis of the polarizer plate and the slow axis of the phase plate are set at optimal angles relative to the director of liquid crystal molecules. Moreover, the liquid crystal film with the viewing-angle increasing function is used and the slow axis of the liquid crystal film is set at an optimal angle. Thereby, good optical characteristics can be realized. In particular, in transmission display, the viewing angle can be increased in the principal viewing-angle direction and anti-principal viewing-angle direction. The viewing-angle dependency of contrast can thus be improved.

In the fourth embodiment, the first polarization control element POL1 includes the uniaxial phase plate (¼ wavelength plate) 52 and liquid crystal film (NR film) 54. However, the phase plate 52 may not be used. In this case, the other structural components of the first polarization control element POL1 and second polarization control element POL2 need to be optimized once again.

For example, as shown in FIG. 27, the formed angle A is 0° and the formed angle B is 36°. Accordingly, an acute angle θ2 formed between the absorption axis 61T of the second polarizer plate 61 and the slow axis 62D of the second phase plate 62 is 36°. In addition, the formed angle C is 95°. An angle between the slow axis of the liquid crystal film 54 and the X axis is 148°. Besides, the retardation value (R value) of the liquid crystal film 54 is 150 nm with respect to light with a wavelength of 550 nm. The retardation value (R value) of the second phase plate 62 is 145 nm with respect to light with a wavelength of 550 nm.

By this setting, a viewing-angle distribution of contrast in the transmission section, which is equivalent to the distributions shown in FIG. 24 and FIG. 26, can be realized.

FIFTH EMBODIMENT

Next, a fifth embodiment of the present invention is described. The first to fourth embodiments are directed to the improvement in optical characteristics and the reduction in thickness and cost. If emphasis is placed the improvement in optical characteristics, an architecture as shown in FIG. 28 may be adopted.

Specifically, in the semi-transmission type liquid crystal display device according to the fifth embodiment, the first polarization control element POL1, which is provided on the array substrate side of the liquid crystal display panel LPN, comprises one polarizer plate 51, one ½ wavelength plate (phase plate) 55 and one liquid crystal film 54 that has a viewing-angle increasing function. The second polarization control element POL2, which is provided on the counter-substrate side of the liquid crystal display panel LPN, comprises one polarizer plate 61, one ½ wavelength plate (phase plate) 63 and one ¼ wavelength plate (phase plate) 62.

FIG. 29 shows a simulation result of ellipticity distributions in the principal viewing-angle direction and anti-principal viewing-angle direction in the liquid crystal display device according to the fifth embodiment. As is clear from comparison between FIG. 9 and FIG. 29, in the fifth embodiment, the ellipticity of elliptically polarized light was successfully increased in the principal viewing-angle direction. That is, elliptically polarized light with an ellipticity of 0.45 or more was obtained in the entire region in the principal viewing-angle direction. Moreover, the ellipticity of elliptically polarized light was successfully decreased in the anti-principal viewing-angle direction. These ellipticity distributions are very close to the ideal ones shown in FIG. 5.

Specifically, the ellipticity of elliptically polarized light that is incident in the principal viewing-angle direction of the liquid crystal display panel has a greater ellipticity distribution than the ellipticity of elliptically polarized light that is incident in the anti-principal viewing-angle direction. The ellipticity distributions in the principal viewing-angle direction and anti-principal viewing-angle direction are asymmetric. Furthermore, the ellipticity distribution has a maximum value of ellipticity in the principal viewing-angle direction.

Thereby, elliptically polarized light, which is incident on the liquid crystal display panel LPN in the principal viewing-angle direction, can be made close to circularly polarized light, and elliptically polarized light, which is incident on the liquid crystal display panel LPN in the anti-principal viewing-angle direction, can be made close to linearly polarized light. Compared to Comparative Example 1, the retardation value of the liquid crystal layer can effectively be optically compensated in the principal viewing-angle direction and anti-principal viewing-angle direction.

Figures 30, 31:
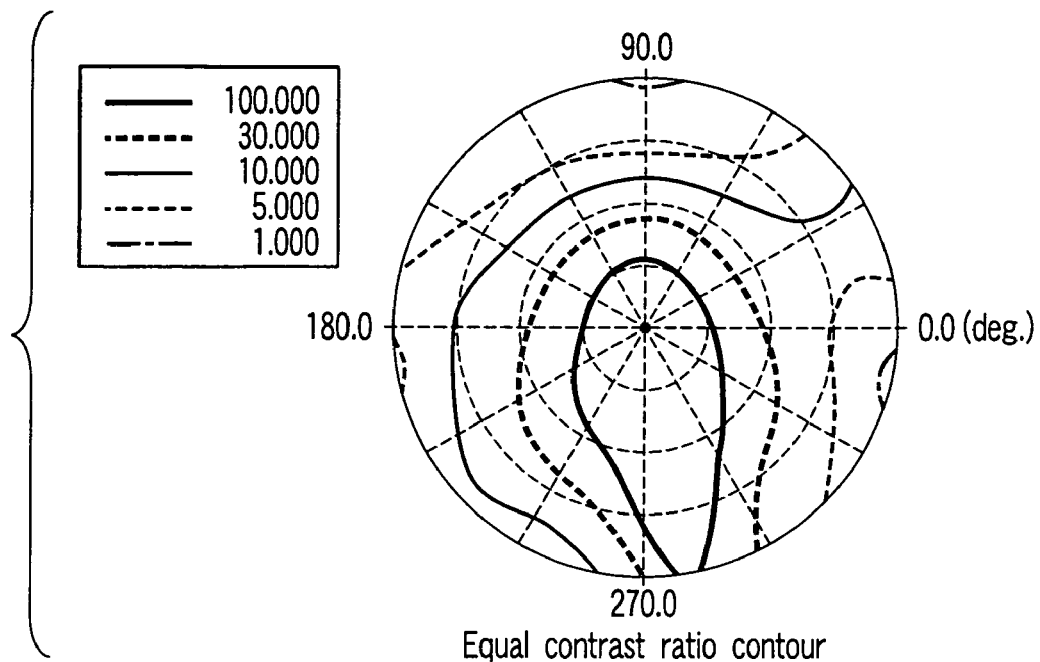
FIG. 30 is a characteristic diagram illustrating the viewing-angle dependency of contrast in the liquid crystal display device according to the fifth embodiment.
FIG. 31 shows examples of angles of absorption axes and slow axes to the X axis in first and second polarization control elements that are applied to a sixth embodiment of the invention, and retardation values of first and second phase plates.

FIG. 30 is a characteristic diagram that simulates the viewing-angle dependency of contrast in the transmission section of the liquid crystal display devices according to the fifth embodiment. As is clear from comparison between FIG. 11 and FIG. 30, in the fifth embodiment, the viewing-angle dependency of contrast was improved in the upper and lower directions of the screen. In particular, it was confirmed that a decrease in contrast in the principal viewing-angle direction was improved. By optimizing the polarization state (ellipticity) of elliptically polarized light that is just about to enter the liquid crystal display panel, the viewing-angle dependency of contrast in the transmission section can dramatically be improved.

SIXTH EMBODIMENT

In a semi-transmission type liquid crystal display device according to a sixth embodiment of the present invention, like the first embodiment, as shown in FIG. 6, a first polarization control element POL1, which is provided on the array substrate side of a liquid crystal display panel LPN, comprises one first polarizer plate 51 and one first phase plate 52. In addition, a second polarization control element POL2, which is provided on the counter-substrate side of the liquid crystal display panel LPN, comprises one second polarizer plate 61 and one second phase plate 62. The first phase plate 52 and second phase plate 62 are uniaxial ¼ wavelength plates, and ZEONOR films are used as these phase plates.

In the sixth embodiment, MJ012166 (manufactured by Merck & Co., Δn=0.06) is used as the liquid crystal composition, and the twist angle of liquid crystal molecules 40 is set at 0 deg (homogeneous orientation). In addition, in this sixth embodiment, the gap in the reflection section PR is set at about 2.8 μm, and the gap in the transmission section PT is set at about 5.1 μm.

In the sixth embodiment, too, the director 40D of the liquid crystal molecule 40 is set at the Y axis. As is shown in FIG. 31, the angle A formed between the absorption axis 61T of the second polarizer plate 61 and the X axis is 1°. The angle B formed between the slow axis 62D of the second phase plate 62 and the X axis is 36°. Accordingly, an acute angle θ2 formed between the absorption axis 61T of the second polarizer plate 61 and the slow axis 62D of the second phase plate 62 is 35°. In addition, the angle C formed between the absorption axis 51T of the first polarizer plate 51 and the X axis is 93.5°. The angle D formed between the slow axis 52D of the first phase plate 52 and the X axis is 146.5°. Accordingly, an acute angle θ1 formed between the absorption axis 51T of the first polarizer plate 51 and the slow axis 52D of the first phase plate 52 is 53°. Besides, the retardation value (R value) of the first phase plate 52 is 145 nm with respect to light with a wavelength of 550 nm. The retardation value (R value) of the second phase plate 62 is 145 nm with respect to light with a wavelength of 550 nm. The above-mentioned formed angles A to D and the retardation values of the first phase plate 52 and second phase plate 62 are merely examples, and are not limited to the values in FIG. 31.

According to the sixth embodiment, the first polarization control element POL1 and second polarization control element POL2, which are optimized as described above, can control the polarization state of light that passes therethrough, and can produce elliptically polarized light that enters the liquid crystal layer LQ. In addition, the ellipticity of light with a wavelength of 550 nm, which is in the polarization state of elliptically polarized light that is incident on the liquid crystal layer LQ, can be set between 0.5 and 0.85. Furthermore, according to the sixth embodiment, the ellipticity of light in a wavelength range of 450 nm to 650 nm, which is incident on the liquid crystal layer LQ, can be made substantially uniform. A difference between a maximum value and a minimum value of the ellipticity can be set at about 0.1.

The optical characteristics of the liquid crystal display device (sixth embodiment) including the first polarization control element POL1 and second polarization control element POL2, which have optimized characteristics, were compared with the optical characteristics of a liquid crystal display device (Comparative Example 2) having a polarization control element including two kinds of phase plates (a ½ wavelength plate and a ¼ wavelength plate). Both devices of Comparative Example 2 and the sixth embodiment are configured as semi-transmission type liquid crystal display devices each having a liquid crystal layer, which includes homogeneously oriented liquid crystal molecules, and a normally white display mode.

As shown in FIG. 32, the device of Comparative Example 2 is configured to have an ellipticity of 0.67 with respect to light with a wavelength of 550 nm, and to have a difference of 0.07 between a maximum value and a minimum value of the ellipticity of light in a wavelength range of 450 nm to 650 nm. The device according to the sixth embodiment is configured to have an ellipticity of 0.67 with respect to light with a wavelength of 550 nm, and to have a difference of 0.1 between a maximum value and a minimum value of the ellipticity of light in a wavelength range of 450 nm to 650 nm.

In Comparative Example 2, the reflection section had a reflectance of 8.30%. In the sixth embodiment, too, the reflection section had a substantially equal reflectance of 8.30%. In Comparative Example 2, the reflection section had a contrast of 13. In the sixth embodiment, the reflection section had a contrast of 12, which is in a tolerable range. In Comparative Example 2, the hue of white of an image displayed on the reflection section was (x, y)=(0.317, 0.343) on the chromaticity coordinates. In the sixth embodiment, the hue of white was (x, y)=(0.321, 0.344) on the chromaticity coordinates, and was substantially equal to that in Comparative Example 2.

In Comparative Example 2, the transmission section had a transmittance of 4.20%. In the sixth embodiment, too, the transmission section had a substantially equal transmittance of 4.20%. In Comparative Example 2, the transmission section had a contrast of 60. In the second embodiment, the transmission section had a contrast of 70, which is higher than the contrast in Comparative Example 2. In Comparative Example 2, the hue of white of an image displayed on the transmission section was (x, y)=(0.289, 0.327) on the chromaticity coordinates. In the sixth embodiment, the hue of white was (x, y)=(0.295, 0.330) on the chromaticity coordinates, and was substantially equal to that in Comparative Example 2.

In the sixth embodiment, the same advantageous effects as with the first embodiment were obtained.

As regards the sixth embodiment, the optical characteristics in the transmission section, in particular, the viewing-angle dependency of contrast in the transmission section, were evaluated. FIG. 33 shows simulation results of ellipticity distributions in the principal viewing-angle direction and anti-principal viewing-angle direction in the liquid crystal display device according to the sixth embodiment.

As is shown in FIG. 33, in the sixth embodiment, the ellipticity of elliptically polarized light was successfully increased on the lower side of the screen, i.e. in the principal viewing-angle direction. That is, elliptically polarized light with an ellipticity of 0.45 or more was obtained in the entire region in the principal viewing-angle direction. Moreover, the variation in the ellipticity distribution in the principal viewing-angle direction was made gentler. Thereby, elliptically polarized light, which is incident on the liquid crystal display panel LPN in the principal viewing-angle direction, was made close to circularly polarized light. The retardation value of the liquid crystal layer in the principal viewing-angle direction can effectively be optically compensated.

Figures 34, 35:
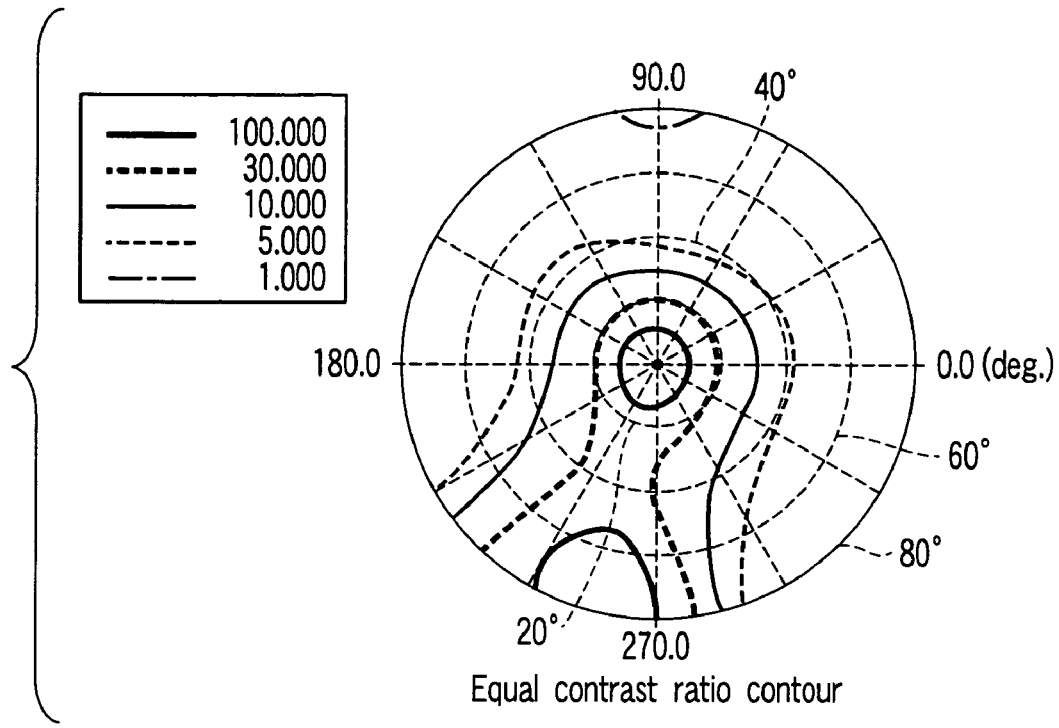
FIG. 34 is a characteristic diagram illustrating the viewing-angle dependency of contrast in the liquid crystal display device according to the sixth embodiment.
FIG. 35 shows examples of angles of absorption axes and slow axes to the X axis in first and second polarization control elements that are applied to a seventh embodiment of the invention, and retardation values of first and second phase plates.

FIG. 34 is a characteristic diagram that simulates the viewing-angle dependency of contrast in the transmission section of the liquid crystal display device according to the sixth embodiment. As is clear from FIG. 34, in the sixth embodiment, the viewing-angle dependency of contrast was improved in the upper and lower directions of the screen. In particular, it was confirmed that a decrease in contrast in the principal viewing-angle direction was improved. The reason for this is that the ellipticity of elliptically polarized light that is incident on the liquid crystal display panel was improved and the retardation value of the liquid crystal layer was compensated.

According to the sixth embodiment, in transmission display, the viewing angle can be increased in the principal viewing-angle direction, and the viewing-angle dependency of contrast can be improved.

SEVENTH EMBODIMENT

In a semi-transmission type liquid crystal display device according to a seventh embodiment of the present invention, like the first embodiment, as shown in FIG. 6, a first polarization control element POL1, which is provided on the array substrate side of a liquid crystal display panel LPN, comprises one first polarizer plate 51 and one first phase plate 52. In addition, a second polarization control element POL2, which is provided on the counter-substrate side of the liquid crystal display panel LPN, comprises one second polarizer plate 61 and one second phase plate 62. The first phase plate 52 and second phase plate 62 are uniaxial ¼ wavelength plates, and ZEONOR films are used as these phase plates.

In the seventh embodiment, MJ981549 (manufactured by Merck & Co., Δn=0.065) is used as the liquid crystal composition, and the twist angle of liquid crystal molecules 40 is set at 0 deg (homogeneous orientation). In addition, in this seventh embodiment, the gap in the reflection section PR is set at about 2.6 μm, and the gap in the transmission section PT is set at about 4.8 μm.

In the seventh embodiment, too, the director 40D of the liquid crystal molecule 40 is set at the Y axis. As is shown in FIG. 35, the angle A formed between the absorption axis 61T of the second polarizer plate 61 and the X axis is 1°. The angle B formed between the slow axis 62D of the second phase plate 62 and the X axis is 36°. Accordingly, an acute angle θ2 formed between the absorption axis 61T of the second polarizer plate 61 and the slow axis 62D of the second phase plate 62 is 35°. In addition, the angle C formed between the absorption axis 51T of the first polarizer plate 51 and the X axis is 91.5°. The angle D formed between the slow axis 52D of the first phase plate 52 and the X axis is 145°. Accordingly, an acute angle θ1 formed between the absorption axis 51T of the first polarizer plate 51 and the slow axis 52D of the first phase plate 52 is 53.5°. Besides, the retardation value (R value) of the first phase plate 52 is 145 nm with respect to light with a wavelength of 550 nm. The retardation value (R value) of the second phase plate 62 is 145 nm with respect to light with a wavelength of 550 nm. The above-mentioned formed angles A to D and the retardation values of the first phase plate 52 and second phase plate 62 are merely examples, and are not limited to the values in FIG. 35.

According to the seventh embodiment, the first polarization control element POL1 and second polarization control element POL2, which are optimized as described above, can control the polarization state of light that passes therethrough, and can produce elliptically polarized light that enters the liquid crystal layer LQ. In addition, the ellipticity of light with a wavelength of 550 nm, which is in the polarization state of elliptically polarized light that is incident on the liquid crystal layer LQ, can be set between 0.5 and 0.85. Furthermore, according to the seventh embodiment, the ellipticity of light in a wavelength range of 450 nm to 650 nm, which is incident on the liquid crystal layer LQ, can be made substantially uniform. A difference between a maximum value and a minimum value of the ellipticity can be set at about 0.1.

The optical characteristics of the liquid crystal display device (seventh embodiment) including the first polarization control element POL1 and second polarization control element POL2, which have optimized characteristics, were compared with the optical characteristics of a liquid crystal display device (Comparative Example 3) having a polarization control element including two kinds of phase plates (a ½ wavelength plate and a ¼ wavelength plate). Both devices of Comparative Example 3 and the seventh embodiment are configured as semi-transmission type liquid crystal display devices each having a liquid crystal layer, which includes homogeneously oriented liquid crystal molecules, and a normally white display mode.

As shown in FIG. 36, the device of Comparative Example 3 is configured to have an ellipticity of 0.67 with respect to light with a wavelength of 550 nm, and to have a difference of 0.07 between a maximum value and a minimum value of the ellipticity of light in a wavelength range of 450 nm to 650 nm. The device according to the seventh embodiment is configured to have an ellipticity of 0.67 with respect to light with a wavelength of 550 nm, and to have a difference of 0.1 between a maximum value and a minimum value of the ellipticity of light in a wavelength range of 450 nm to 650 nm.

In Comparative Example 3, the reflection section had a reflectance of 7.50%. In the seventh embodiment, too, the reflection section had a substantially equal reflectance of 7.60%. In Comparative Example 3 and the seventh embodiment, each reflection section had a contrast of 23. In Comparative Example 3, the hue of white of an image displayed on the reflection section was (x, y)=(0.327, 0.361) on the chromaticity coordinates. In the seventh embodiment, the hue of white was (x, y)=(0.322, 0.355) on the chromaticity coordinates, and was substantially equal to that in Comparative Example 3.

In Comparative Example 3 and the seventh embodiment, each transmission section had a transmittance of 4.20%. In Comparative Example 3, the transmission section had a contrast of 125. In the seventh embodiment, the transmission section had a contrast of 188, which is higher than the contrast in Comparative Example 3. In Comparative Example 3, the hue of white of an image displayed on the transmission section was (x, y)=(0.303, 0.328) on the chromaticity coordinates. In the seventh embodiment, the hue of white was (x, y)=(0.304, 0.327) on the chromaticity coordinates, and was substantially equal to that in Comparative Example 3.

In the seventh embodiment, the same advantageous effects as with the first embodiment were obtained.

As regards the seventh embodiment, the optical characteristics in the transmission section, in particular, the viewing-angle dependency of contrast in the transmission section, were evaluated. FIG. 37 shows simulation results of ellipticity distributions in the principal viewing-angle direction and anti-principal viewing-angle direction in the liquid crystal display device according to the seventh embodiment.

As is shown in FIG. 37, in the seventh embodiment, the ellipticity of elliptically polarized light was successfully increased on the lower side of the screen, i.e. in the principal viewing-angle direction. That is, elliptically polarized light with an ellipticity of 0.45 or more was obtained in the entire region in the principal viewing-angle direction. Moreover, the variation in the ellipticity distribution in the principal viewing-angle direction was made gentler. Thereby, elliptically polarized light, which is incident on the liquid crystal display panel LPN in the principal viewing-angle direction, was made close to circularly polarized light. The retardation value of the liquid crystal layer in the principal viewing-angle direction can effectively be optically compensated.

Figures 38, 39:
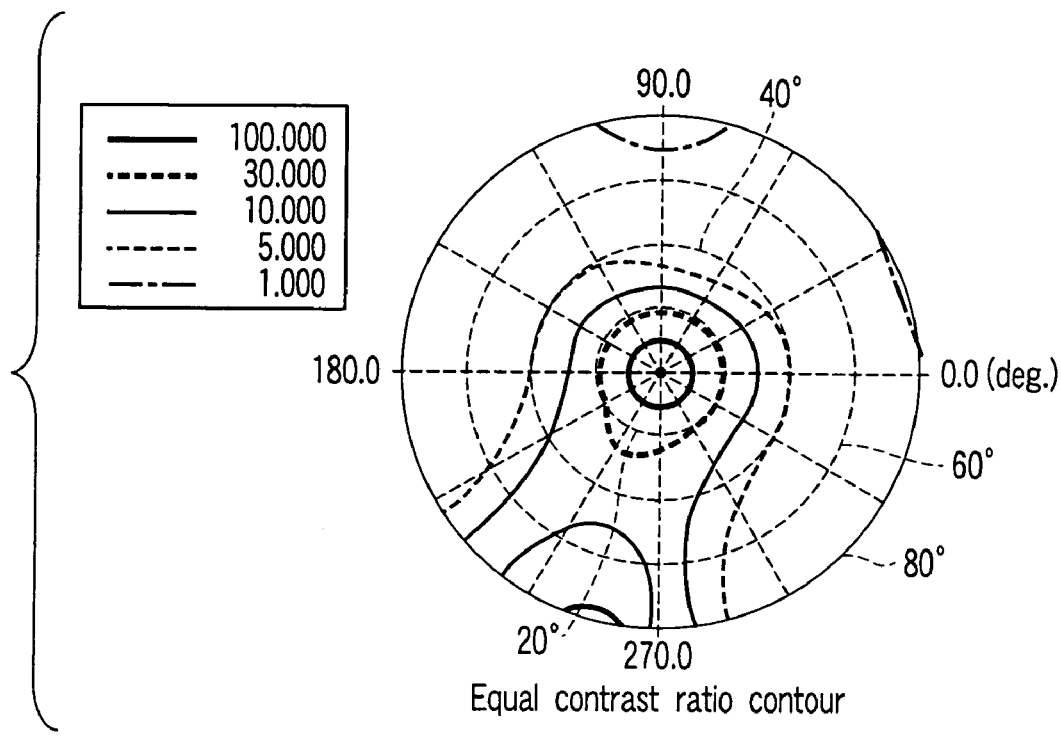
FIG. 38 is a characteristic diagram illustrating the viewing-angle dependency of contrast in the liquid crystal display device according to the seventh embodiment.
FIG. 39 shows examples of angles of absorption axes and slow axes to the X axis in first and second polarization control elements that are applied to an eighth embodiment of the invention, and retardation values of first and second phase plates.

FIG. 38 is a characteristic diagram that simulates the viewing-angle dependency of contrast in the transmission section of the liquid crystal display device according to the seventh embodiment. As is clear from FIG. 38, in the seventh embodiment, the viewing-angle dependency of contrast was improved in the upper and lower directions of the screen. In particular, it was confirmed that a decrease in contrast in the principal viewing-angle direction was improved. The reason for this is that the ellipticity of elliptically polarized light that is incident on the liquid crystal display panel was improved and the retardation value of the liquid crystal layer was compensated.

According to the seventh embodiment, in transmission display, the viewing angle can be increased in the principal viewing-angle direction, and the viewing-angle dependency of contrast can be improved.

EIGHTH EMBODIMENT

In a semi-transmission type liquid crystal display device according to an eighth embodiment of the present invention, like the first embodiment, as shown in FIG. 6, a first polarization control element POL1, which is provided on the array substrate side of a liquid crystal display panel LPN, comprises one first polarizer plate 51 and one first phase plate 52. In addition, a second polarization control element POL2, which is provided on the counter-substrate side of the liquid crystal display panel LPN, comprises one second polarizer plate 61 and one second phase plate 62. The first phase plate 52 and second phase plate 62 are uniaxial ¼ wavelength plates, and ZEONOR films are used as these phase plates.

In the eighth embodiment, MJ032591 (manufactured by Merck & Co., Δn=0.07) is used as the liquid crystal composition, and the twist angle of liquid crystal molecules 40 is set at 0 deg (homogeneous orientation). In addition, in this eighth embodiment, the gap in the reflection section PR is set at about 2.4 μm, and the gap in the transmission section PT is set at about 4.6 μm.

In the eighth embodiment, too, the director 40D of the liquid crystal molecule 40 is set at the Y axis. As is shown in FIG. 39, the angle A formed between the absorption axis 61T of the second polarizer plate 61 and the X axis is 1°. The angle B formed between the slow axis 62D of the second phase plate 62 and the X axis is 36°. Accordingly, an acute angle θ2 formed between the absorption axis 61T of the second polarizer plate 61 and the slow axis 62D of the second phase plate 62 is 35°. In addition, the angle C formed between the absorption axis 51T of the first polarizer plate 51 and the X axis is 89°. The angle D formed between the slow axis 52D of the first phase plate 52 and the X axis is 144°. Accordingly, an acute angle θ1 formed between the absorption axis 51T of the first polarizer plate 51 and the slow axis 52D of the first phase plate 52 is 55°. Besides, the retardation value (R value) of the first phase plate 52 is 145 nm with respect to light with a wavelength of 550 nm. The retardation value (R value) of the second phase plate 62 is 145 nm with respect to light with a wavelength of 550 nm. The above-mentioned formed angles A to D and the retardation values of the first phase plate 52 and second phase plate 62 are merely examples, and are not limited to the values in FIG. 39.

According to the eighth embodiment, the first polarization control element POL1 and second polarization control element POL2, which are optimized as described above, can control the polarization state of light that passes therethrough, and can produce elliptically polarized light that enters the liquid crystal layer LQ. In addition, the ellipticity of light with a wavelength of 550 nm, which is in the polarization state of elliptically polarized light that is incident on the liquid crystal layer LQ, can be set between 0.5 and 0.85. Furthermore, according to the eighth embodiment, the ellipticity of light in a wavelength range of 450 nm to 650 nm, which is incident on the liquid crystal layer LQ, can be made substantially uniform. A difference between a maximum value and a minimum value of the ellipticity can be set at about 0.1.

The optical characteristics of the liquid crystal display device (eighth embodiment) including the first polarization control element POL1 and second polarization control element POL2, which have optimized characteristics, were compared with the optical characteristics of a liquid crystal display device (Comparative Example 4) having a polarization control element including two kinds of phase plates (a ½ wavelength plate and a ¼ wavelength plate). Both devices of Comparative Example 4 and the eighth embodiment are configured as semi-transmission type liquid crystal display devices each having a liquid crystal layer, which includes homogeneously oriented liquid crystal molecules, and a normally white display mode.

Figures 40, 41:
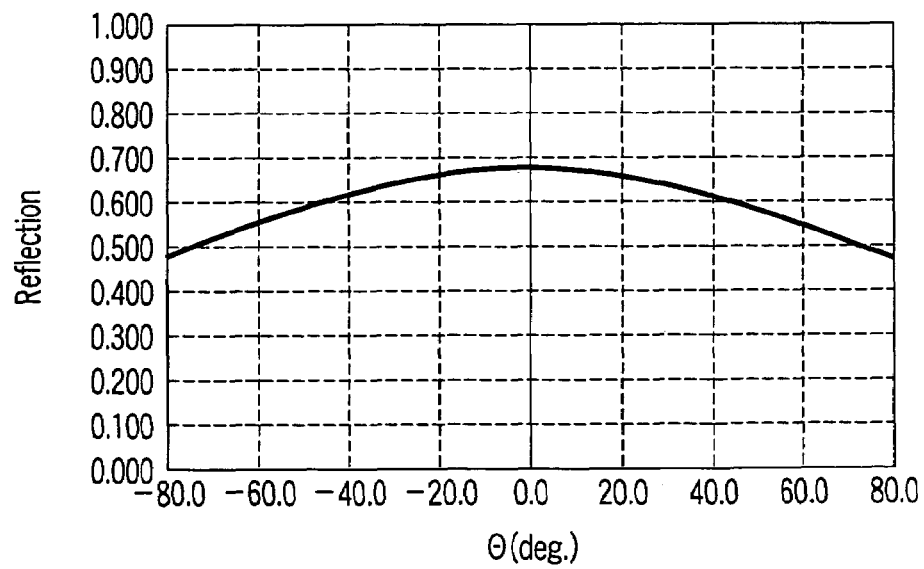
FIG. 40 shows a comparison result of optical characteristics between Comparative Example 4 and the eighth embodiment.
FIG. 41 shows an example of an ellipticity distribution in relation to an angle Θ to a normal line in the liquid crystal display device according to the eighth embodiment.

As shown in FIG. 40, the device of Comparative Example 4 is configured to have an ellipticity of 0.67 with respect to light with a wavelength of 550 nm, and to have a difference of 0.07 between a maximum value and a minimum value of the ellipticity of light in a wavelength range of 450 nm to 650 nm. The device according to the eighth embodiment is configured to have an ellipticity of 0.67 with respect to light with a wavelength of 550 nm, and to have a difference of 0.1 between a maximum value and a minimum value of the ellipticity of light in a wavelength range of 450 nm to 650 nm.

In Comparative Example 4 and the eighth embodiment, each reflection section had a reflectance of 9.70%. In Comparative Example 4, the reflection section had a contrast of 15. In the eighth embodiment, the reflection section had a contrast of 14. In Comparative Example 4, the hue of white of an image displayed on the reflection section was (x, y)=(0.299, 0.317) on the chromaticity coordinates. In the eighth embodiment, the hue of white was (x, y)=(0.301, 0.319) on the chromaticity coordinates, and was substantially equal to that in Comparative Example 4.

In Comparative Example 4 and the eighth embodiment, each transmission section had a transmittance of 5.20%. In Comparative Example 4 and the eighth embodiment, each transmission section had a contrast of 120. In Comparative Example 4, the hue of white of an image displayed on the transmission section was (x, y)=(0.319, 0.338) on the chromaticity coordinates. In the eighth embodiment, the hue of white was (x, y)=(0.320, 0.338) on the chromaticity coordinates, and was substantially equal to that in Comparative Example 4.

In the eighth embodiment, the same advantageous effects as with the first embodiment were obtained.

As regards the eighth embodiment, the optical characteristics in the transmission section, in particular, the viewing-angle dependency of contrast in the transmission section, were evaluated. FIG. 41 shows simulation results of ellipticity distributions in the principal viewing-angle direction and anti-principal viewing-angle direction in the liquid crystal display device according to the eighth embodiment.

As is shown in FIG. 41, in the eighth embodiment, the ellipticity of elliptically polarized light was successfully increased on the lower side of the screen, i.e. in the principal viewing-angle direction. That is, elliptically polarized light with an ellipticity of 0.45 or more was obtained in the entire region in the principal viewing-angle direction. Moreover, the variation in the ellipticity distribution in the principal viewing-angle direction was made gentler. Thereby, elliptically polarized light, which is incident on the liquid crystal display panel LPN in the principal viewing-angle direction, was made close to circularly polarized light. The retardation value of the liquid crystal layer in the principal viewing-angle direction can effectively be optically compensated.

Figures 42, 43:
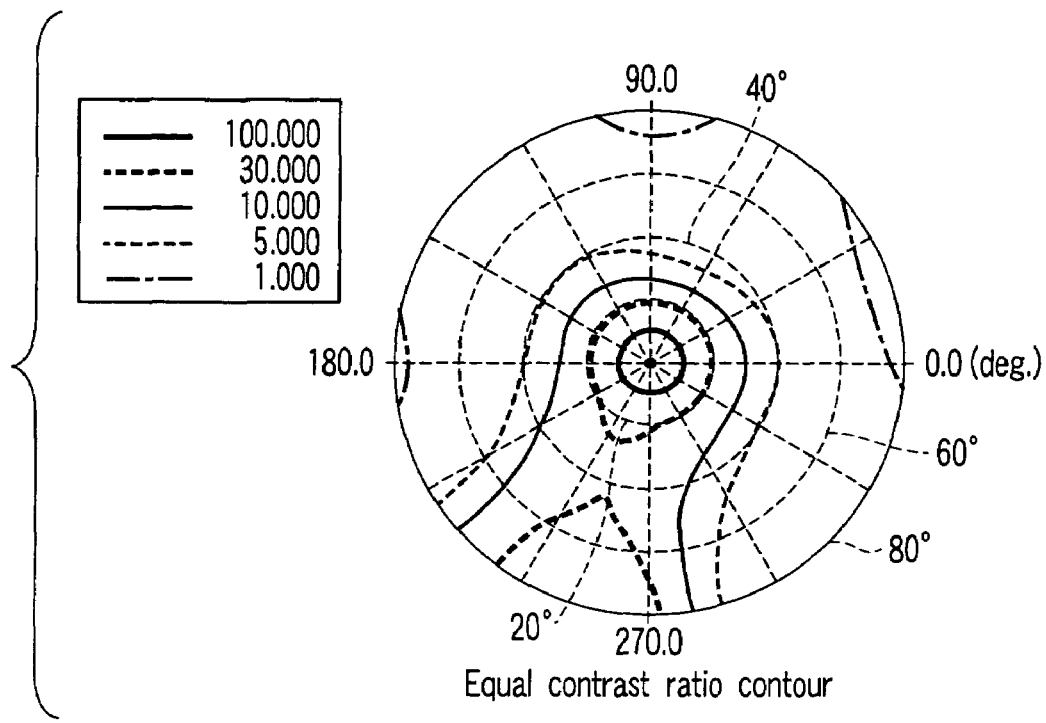
FIG. 42 is a characteristic diagram illustrating the viewing-angle dependency of contrast in the liquid crystal display device according to the eighth embodiment.
FIG. 43 shows examples of angles of absorption axes and slow axes to the X axis in first and second polarization control elements that are applied to a ninth embodiment of the invention, and retardation values of first and second phase plates.

FIG. 42 is a characteristic diagram that simulates the viewing-angle dependency of contrast in the transmission section of the liquid crystal display device according to the eighth embodiment. As is clear from FIG. 42, in the eighth embodiment, the viewing-angle dependency of contrast was improved in the upper and lower directions of the screen. In particular, it was confirmed that a decrease in contrast in the principal viewing-angle direction was improved. The reason for this is that the ellipticity of elliptically polarized light that is incident on the liquid crystal display panel was improved and the retardation value of the liquid crystal layer was compensated.

According to the eighth embodiment, in transmission display, the viewing angle can be increased in the principal viewing-angle direction, and the viewing-angle dependency of contrast can be improved.

NINTH EMBODIMENT

In a semi-transmission type liquid crystal display device according to a ninth embodiment of the present invention, like the first embodiment, as shown in FIG. 6, a first polarization control element POL1, which is provided on the array substrate side of a liquid crystal display panel LPN, comprises one first polarizer plate 51 and one first phase plate 52. In addition, a second polarization control element POL2, which is provided on the counter-substrate side of the liquid crystal display panel LPN, comprises one second polarizer plate 61 and one second phase plate 62. The first phase plate 52 is a uniaxial ¼ wavelength plate, and an NEZ film (manufactured by Nitto Denko Corp.) is used as the first phase plate 52. The second phase plate 62 is a uniaxial ¼ wavelength plate, and a ZEONOR film is used as the second phase plate 62.

In the ninth embodiment, MJ012166 (manufactured by Merck & Co., $\Delta n=0.06$) is used as the liquid crystal composition, and the twist angle of liquid crystal molecules 40 is set at 0 deg (homogeneous orientation). In addition, in this ninth embodiment, the gap in the reflection section PR is set at about 2.8 µm, and the gap in the transmission section PT is set at about 5.1 µm.

In the ninth embodiment, too, the director 40D of the liquid crystal molecule 40 is set at the Y axis. As is shown in FIG. 43, the angle A formed between the absorption axis 61T of the second polarizer plate 61 and the X axis is 10. The angle B formed between the slow axis 62D of the second phase plate 62 and the X axis is 36°. Accordingly, an acute angle θ2 formed between the absorption axis 61T of the second polarizer plate 61 and the slow axis 62D of the second phase plate 62 is 35°. In addition, the angle C formed between the absorption axis 51T of the first polarizer plate 51 and the X axis is 92.5°. The angle D formed between the slow axis 52D of the first phase plate 52 and the X axis is 145.5°. Accordingly, an acute angle θ1 formed between the absorption axis 51T of the first polarizer plate 51 and the slow axis 52D of the first phase plate 52 is 53°. Besides, the retardation value (R value) of the first phase plate 52 is 135 nm with respect to light with a wavelength of 550 nm. The retardation value (R value) of the second phase plate 62 is 145 nm with respect to light with a wavelength of 550 nm. The above-mentioned formed angles A to D and the retardation values of the first phase plate 52 and second phase plate 62 are not limited to the values in FIG. 43.

According to the ninth embodiment, the first polarization control element POL1 and second polarization control element POL2, which are optimized as described above, can control the polarization state of light that passes therethrough, and can produce elliptically polarized light that enters the liquid crystal layer LQ. In addition, the ellipticity of light with a wavelength of 550 nm, which is in the polarization state of elliptically polarized light that is incident on the liquid crystal layer LQ, can be set between 0.5 and 0.85. Furthermore, according to the ninth embodiment, the ellipticity of light in a wavelength range of 450 nm to 650 nm, which is incident on the liquid crystal layer LQ, can be made substantially uniform. A difference between a maximum value and a minimum value of the ellipticity can be set at about 0.1.

The optical characteristics of the liquid crystal display device (ninth embodiment) including the first polarization control element POL1 and second polarization control element POL2, which have optimized characteristics, were compared with the optical characteristics of a liquid crystal display device (Comparative Example 5) having a polarization control element including two kinds of phase plates (a ½ wavelength plate and a ¼ wavelength plate). Both devices of Comparative Example 5 and the ninth embodiment are configured as semi-transmission type liquid crystal display devices each having a liquid crystal layer, which includes homogeneously oriented liquid crystal molecules, and a normally white display mode.

Figures 44, 45:
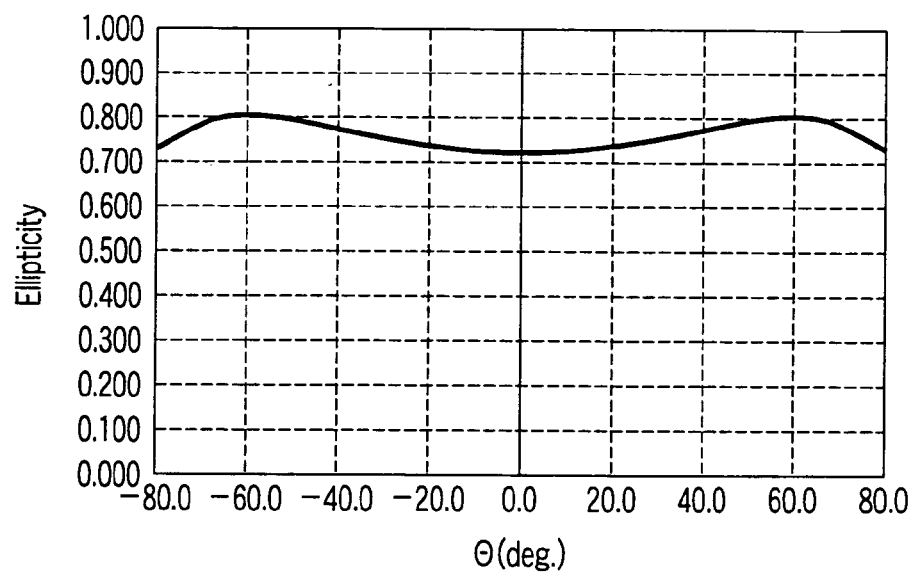
FIG. 44 shows a comparison result of optical characteristics between Comparative Example 5 and the ninth embodiment.
FIG. 45 shows an example of an ellipticity distribution in relation to an angle Θ to a normal line in the liquid crystal display device according to the ninth embodiment.

As shown in FIG. 44, the device of Comparative Example 5 is configured to have an ellipticity of 0.67 with respect to light with a wavelength of 550 nm, and to have a difference of 0.07 between a maximum value and a minimum value of the ellipticity of light in a wavelength range of 450 nm to 650 nm. The device according to the ninth embodiment is configured to have an ellipticity of 0.67 with respect to light with a wavelength of 550 nm, and to have a difference of 0.1 between a maximum value and a minimum value of the ellipticity of light in a wavelength range of 450 nm to 650 nm.

In Comparative Example 5 and the ninth embodiment, each reflection section had a reflectance of 8.30%. In Comparative Example 5, the reflection section had a contrast of 13. In the ninth embodiment, the reflection section had a contrast of 12. In Comparative Example 5, the hue of white of an image displayed on the reflection section was (x, y)=(0.317, 0.343) on the chromaticity coordinates. In the ninth embodiment, the hue of white was (x, y)=(0.321, 0.344) on the chromaticity coordinates, and was substantially equal to that in Comparative Example 5.

In Comparative Example 5 and the ninth embodiment, each transmission section had a transmittance of 4.20%. In Comparative Example 5, the transmission section had a contrast of 60. In the ninth embodiment, the transmission section had a contrast of 65. In Comparative Example 5, the hue of white of an image displayed on the transmission section was (x, y)=(0.289, 0.327) on the chromaticity coordinates. In the ninth embodiment, the hue of white was (x, y)=(0.295, 0.330) on the chromaticity coordinates, and was substantially equal to that in Comparative Example 5.

In the ninth embodiment, the same advantageous effects as with the first embodiment were obtained.

As regards the ninth embodiment, the optical characteristics in the transmission section, in particular, the viewing-angle dependency of contrast in the transmission section, were evaluated. FIG. 45 shows simulation results of ellipticity distributions in the principal viewing-angle direction and anti-principal viewing-angle direction in the liquid crystal display device according to the ninth embodiment.

As is shown in FIG. 45, in the ninth embodiment, the ellipticity of elliptically polarized light was successfully increased on the lower side of the screen, i.e. in the principal viewing-angle direction. That is, elliptically polarized light with an ellipticity of 0.45 or more was obtained in the entire region in the principal viewing-angle direction. Moreover, the variation in the ellipticity distribution in the principal viewing-angle direction was made gentler. Thereby, elliptically polarized light, which is incident on the liquid crystal display panel LPN in the principal viewing-angle direction, was made close to circularly polarized light. The retardation value of the liquid crystal layer in the principal viewing-angle direction can effectively be optically compensated.

FIG. 46 is a characteristic diagram that simulates the viewing-angle dependency of contrast in the transmission section of the liquid crystal display device according to the ninth embodiment. As is clear from FIG. 46, in the ninth embodiment, the viewing-angle dependency of contrast was improved in the upper and lower directions of the screen. In particular, it was confirmed that a decrease in contrast in the principal viewing-angle direction was improved. The reason for this is that the ellipticity of elliptically polarized light that is incident on the liquid crystal display panel was improved and the retardation value of the liquid crystal layer was compensated.

According to the ninth embodiment, in transmission display, the viewing angle can be increased in the principal viewing-angle direction, and the viewing-angle dependency of contrast can be improved.

TENTH EMBODIMENT

In a semi-transmission type liquid crystal display device according to a tenth embodiment of the present invention, as shown in FIG. 47, a first polarization control element POL1, which is provided on the array substrate side of a liquid crystal display panel LPN, comprises one first polarizer plate 51, one compensation plate 56 and one liquid crystal film 54. In addition, a second polarization control element POL2, which is provided on the counter-substrate side of the liquid crystal display panel LPN, comprises one second polarizer plate 61 and one second phase plate 62. The liquid crystal film 54 is a uniaxial ¼ wavelength plate, and an NR film, which has been described in the preceding fourth embodiment, is used as the liquid crystal film 54. The compensation plate 56 is a uniaxial ½ wavelength plate, and a ZEONOR film is used as the compensation plate 56. The second phase plate 62 is a uniaxial ¼ wavelength plate, and a ZEONOR film is used as the second phase plate 62.

In the tenth embodiment, MJ012166 (manufactured by Merck & Co., Δn=0.061) is used as the liquid crystal composition, and the twist angle of liquid crystal molecules 40 is set at 0 deg (homogeneous orientation). In addition, in this tenth embodiment, the gap in the reflection section PR is set at about 2.8 μm, and the gap in the transmission section PT is set at about 5.1 μm.

In the tenth embodiment, too, the director 40D of the liquid crystal molecule 40 is set at the Y axis. As is shown in FIG. 48, the angle A formed between the absorption axis 61T of the second polarizer plate 61 and the X axis is 1°. The angle B formed between the slow axis 62D of the second phase plate 62 and the X axis is 36°. Accordingly, an acute angle θ2 formed between the absorption axis 61T of the second polarizer plate 61 and the slow axis 62D of the second phase plate 62 is 35°. In addition, the angle C formed between the absorption axis 51T of the first polarizer plate 51 and the X axis is 132°. The angle D formed between the slow axis 52D of the liquid crystal film 54 and the X axis is 600. Accordingly, an acute angle θ1 formed between the absorption axis 51T of the first polarizer plate 51 and the slow axis 52D of the liquid crystal film 54 is 72°. Besides, the retardation value (R value) of the liquid crystal film 54 is 120 nm with respect to light with a wavelength of 550 nm. The retardation value (R value) of the second phase plate 62 is 145 nm with respect to light with a wavelength of 550 nm. The retardation value (R value) of the compensation plate 56 is 270 nm with respect to light with a wavelength of 550 nm. An angle formed between the slow axis of the compensation plate 56 and the X axis is 67.5°. The above-mentioned formed angles A to D and the retardation values are not limited to the values in FIG. 48.

According to the tenth embodiment, the first polarization control element POL1 and second polarization control element POL2, which are optimized as described above, can control the polarization state of light that passes therethrough, and can produce elliptically polarized light that enters the liquid crystal layer LQ. In addition, the ellipticity of light with a wavelength of 550 nm, which is in the polarization state of elliptically polarized light that is incident on the liquid crystal layer LQ, can be set between 0.5 and 0.85. Furthermore, according to the tenth embodiment, the ellipticity of light in a wavelength range of 450 nm to 650 nm, which is incident on the liquid crystal layer LQ, can be made substantially uniform. A difference between a maximum value and a minimum value of the ellipticity can be set at about 0.1.

The optical characteristics of the liquid crystal display device (tenth embodiment) including the first polarization control element POL1 and second polarization control element POL2, which have optimized characteristics, were compared with the optical characteristics of a liquid crystal display device (Comparative Example 6) having a polarization control element including two kinds of phase plates (a ½ wavelength plate and a ¼ wavelength plate). Both devices of Comparative Example 6 and the tenth embodiment are configured as semi-transmission type liquid crystal display devices each having a liquid crystal layer, which includes homogeneously oriented liquid crystal molecules, and a normally white display mode.

As shown in FIG. 49, the device of Comparative Example 6 is configured to have an ellipticity of 0.67 with respect to light with a wavelength of 550 nm, and to have a difference of 0.07 between a maximum value and a minimum value of the ellipticity of light in a wavelength range of 450 nm to 650 nm. The device according to the tenth embodiment is configured to have an ellipticity of 0.67 with respect to light with a wavelength of 550 nm, and to have a difference of 0.1 between a maximum value and a minimum value of the ellipticity of light in a wavelength range of 450 nm to 650 nm.

In Comparative Example 6 and the tenth embodiment, each reflection section had a reflectance of 8.30%. In Comparative Example 6, the reflection section had a contrast of 13. In the tenth embodiment, the reflection section had a contrast of 12. In Comparative Example 6, the hue of white of an image displayed on the reflection section was (x, y)=(0.317, 0.343) on the chromaticity coordinates. In the tenth embodiment, the hue of white was (x, y)=(0.321, 0.344) on the chromaticity coordinates, and was substantially equal to that in Comparative Example 6.

In Comparative Example 6 and the tenth embodiment, each transmission section had a transmittance of 4.20%. In Comparative Example 6 and the tenth embodiment, each transmission section had a contrast of 60. In Comparative Example 6, the hue of white of an image displayed on the transmission section was (x, y)=(0.289, 0.327) on the chromaticity coordinates. In the tenth embodiment, the hue of white was (x, y)=(0.294, 0.327) on the chromaticity coordinates, and was substantially equal to that in Comparative Example 6.

In the tenth embodiment, the same advantageous effects as with the first embodiment were obtained.

As regards the tenth embodiment, the optical characteristics in the transmission section, in particular, the viewing-angle dependency of contrast in the transmission section, were evaluated. FIG. 50 shows simulation results of ellipticity distributions in the principal viewing-angle direction and anti-principal viewing-angle direction in the liquid crystal display device according to the tenth embodiment.

As is shown in FIG. 50, in the tenth embodiment, the ellipticity of elliptically polarized light was successfully increased on the lower side of the screen, i.e. in the principal viewing-angle direction. That is, elliptically polarized light with an ellipticity of 0.45 or more was obtained in the entire region in the principal viewing-angle direction. Moreover, the variation in the ellipticity distribution in the principal viewing-angle direction was made gentler. Thereby, elliptically polarized light, which is incident on the liquid crystal display panel LPN in the principal viewing-angle direction, was made close to circularly polarized light. The retardation value of the liquid crystal layer in the principal viewing-angle direction can effectively be optically compensated.

FIG. 51 is a characteristic diagram that simulates the viewing-angle dependency of contrast in the transmission section of the liquid crystal display device according to the tenth embodiment. As is clear from FIG. 51, in the tenth embodiment, the viewing-angle dependency of contrast was improved in the upper and lower directions of the screen. In particular, it was confirmed that a decrease in contrast in the principal viewing-angle direction was improved. The reason for this is that the ellipticity of elliptically polarized light that is incident on the liquid crystal display panel was improved and the retardation value of the liquid crystal layer was compensated.

According to the tenth embodiment, in transmission display, the viewing angle can be increased in the principal viewing-angle direction, and the viewing-angle dependency of contrast can be improved.

The present invention is not limited to the above-described embodiments. In practicing the invention, structural elements may be modified and embodied without departing from the spirit of the invention. A plurality of structural elements disclosed in the embodiments may be properly combined to constitute various inventions. For example, some of the structural elements in the embodiments may be omitted. Furthermore, structural elements in different embodiments may be properly combined.

In each of the above-described embodiments, the liquid crystal layer LQ is formed of the liquid crystal composition including homogeneously oriented liquid crystal molecules 40 with a twist angle of 0°. However, the present invention is not restricted by the twist angle of liquid crystal molecules. For example, the liquid crystal layer LQ may be formed of a liquid crystal composition that includes homogeneously oriented liquid crystal molecules 40 with a twist angle of 45°. With this structure, the same advantageous effects as with each of the embodiments can be obtained.

Each of the first polarization control element POL1 and second polarization control element POL2 may be formed by attaching a high-polymer-film phase plate to a polarizer plate, or by disposing a liquid crystal film on a polarizer plate. The polarization control element including a liquid crystal film can be formed by coating a liquid crystal composition, for instance, a liquid crystal composition including nematic liquid crystal, on a polarizer plate and then curing the liquid crystal composition. In this case, the thickness of the liquid crystal film is set so as to obtain a desired retardation value. When the polarization control element including such a liquid crystal film is to be applied, there arises no problem if the director of the liquid crystal molecules in the liquid crystal film is made to agree with the aforementioned slow axis.

In the embodiments, the switching element W is formed of an N-channel thin-film transistor. Alternatively, other architectures may be adopted if similar drive signals can be produced.

As has been described above, the present invention can provide a liquid crystal display device with good optical characteristics, which can realize reduction in thickness and cost.

What is claimed is:

1. A liquid crystal display device including a reflection section and a transmission section in each of a plurality of pixels arranged in a matrix, the device comprising:
    a liquid crystal display panel in which a liquid crystal layer is held between a first substrate and a second substrate that are disposed to face each other;
    a first polarization control element provided on an outer surface of the first substrate, which is opposed to a surface of the first substrate that holds the liquid crystal layer; and
    a second polarization control element provided on an outer surface of the second substrate, which is opposed to a surface of the second substrate that holds the liquid crystal layer,
    wherein the first polarization control element and the second polarization control element control a polarization state of light that passes therethrough, such that light in a polarization state of elliptically polarized light is to be incident on the liquid crystal layer, and
    an ellipticity of elliptically polarized light, which is incident on the liquid crystal display panel in a principal viewing-angle direction is greater than an ellipticity of elliptically polarized light, which is incident in a anti-principal viewing-angle direction.

2. The liquid crystal display device according to claim 1, wherein an ellipticity distribution of elliptically polarized light that is incident on the liquid crystal display panel is asymmetric between the principal viewing-angle direction and the anti-principal viewing-angle direction with reference to a normal line of the liquid crystal display panel.

3. The liquid crystal display device according to claim 1, wherein an ellipticity distribution of elliptically polarized light that is incident on the liquid crystal display panel has a maximum value of ellipticity in the principal viewing-angle direction.

4. The liquid crystal display device according to claim 1, wherein each of the first polarization control element and the second polarization control element comprises at least one polarizer plate and at least one phase plate.

5. The liquid crystal display device according to claim 4, wherein the phase plate is a ¼ wavelength plate that provides a phase difference of ¼ wavelength between an ordinary ray and an extraordinary ray with respect to light of a predetermined wavelength.

6. The liquid crystal display device according to claim 4, wherein in each of the first polarization control element and the second polarization control element, an acute angle formed between an absorption axis of the polarizer plate and a slow axis of the phase plate is set in a range between. 25° and 70°.

7. The liquid crystal display device according to claim 1, further comprising a backlight unit that illuminates the liquid crystal display panel from the first polarization control element side.

8. The liquid crystal display device according to claim 1, wherein a display mode is a normally white mode.

9. The liquid crystal display device according to claim 1, wherein at least one of the first polarization control element and the second polarization control element includes a biaxial phase plate.

10. The liquid crystal display device according to claim 1, wherein at least one of the first polarization control element and the second polarization control element includes a liquid crystal film in which liquid crystal molecules are hybrid-oriented.

11. The liquid crystal display device according to claim 1, wherein the first polarization control element comprises one polarizer plate, a uniaxial ¼ wavelength plate that provides a phase difference of ¼ wavelength between an ordinary ray and an extraordinary ray with respect to light of a predetermined wavelength, and a liquid crystal film in which liquid crystal molecules are hybrid-oriented, and the second polarization control element comprises one polarizer plate and a uniaxial ¼ wavelength plate.

12. The liquid crystal display device according to claim 1, wherein the first polarization control element comprises one polarizer plate, a biaxial ¼ wavelength plate that provides a phase difference of ¼ wavelength between an ordinary ray and an extraordinary ray with respect to light of a predetermined wavelength, and a liquid crystal film in which liquid crystal molecules are hybrid-oriented, and the second polarization control element comprises one polarizer plate and a uniaxial ¼ wavelength plate.

13. A liquid crystal display device including a reflection section and a transmission section in each of a plurality of pixels arranged in a matrix, the device comprising:

a liquid crystal display panel in which a liquid crystal layer is held between a first substrate and a second substrate that are disposed to face each other;

a first polarization control element provided on an outer surface of the first substrate, which is opposed to a surface of the first substrate that holds the liquid crystal layer; and a second polarization control element provided on an outer surface of the second substrate, which is opposed to a surface of the second substrate that holds the liquid crystal layer, wherein the first polarization control element and the second polarization control element control a polarization state of light that passes therethrough, such that light in a polarization state of elliptically polarized light is to be incident on the liquid crystal layer, and an ellipticity of elliptically polarized light, which is incident on the liquid crystal display panel in a principal viewing-angle direction is 0.45 or more.

14. The liquid crystal display device according to claim 13, wherein each of the first polarization control element and the second polarization control element comprises a polarizer plate and a uniaxial ¼ wavelength plate that provides a phase difference of ¼ wavelength between an ordinary ray and an extraordinary ray with respect to light of a predetermined wavelength.

15. The liquid crystal display device according to claim 14, wherein in each of the first polarization control element and the second polarization control element, an acute angle formed between an absorption axis of the polarizer plate and a slow axis of the phase plate is set in a range between 25° and 70°.

* * * * *